Figure 1:
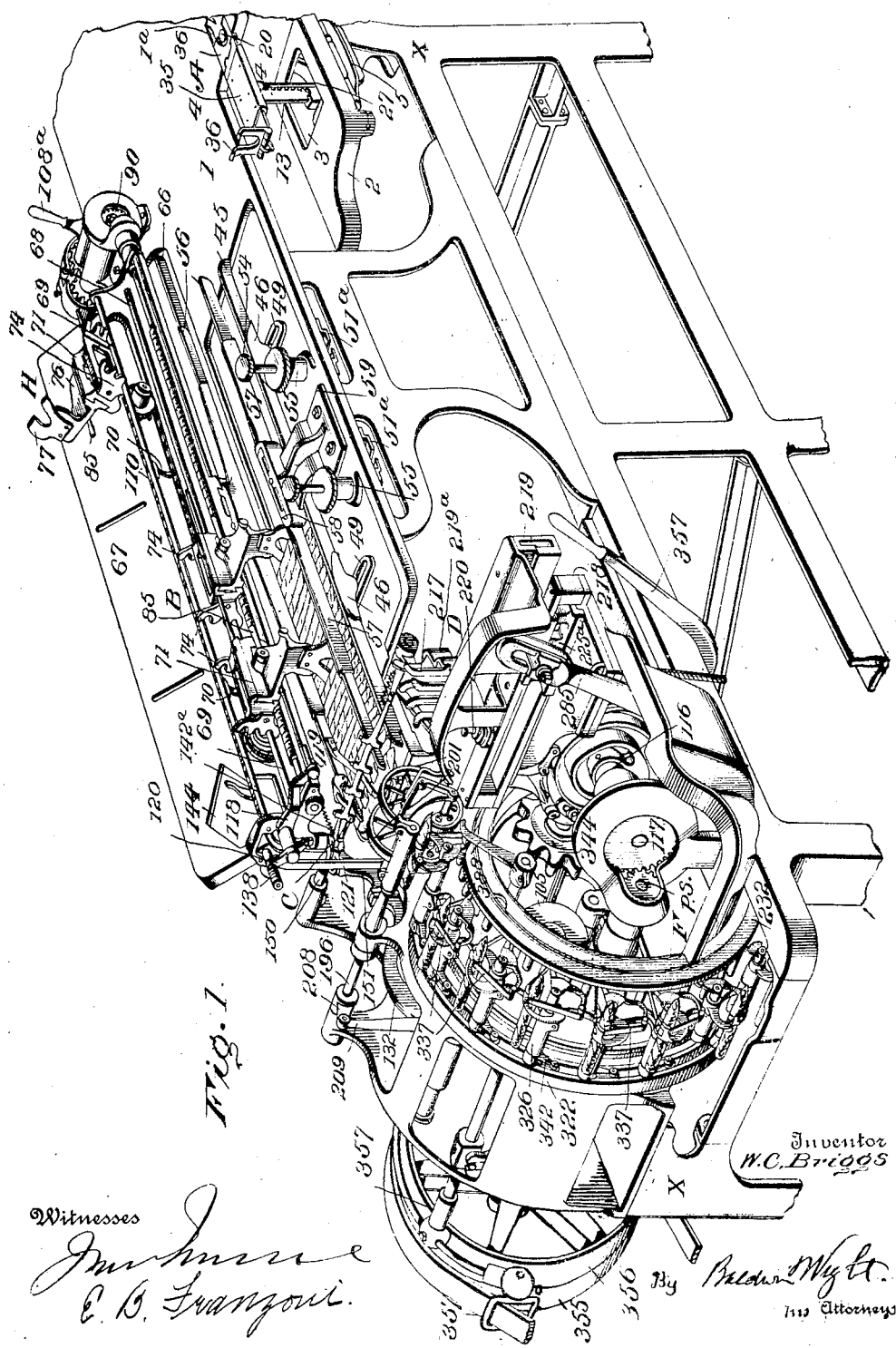

W. C. BRIGGS.
MACHINE FOR APPLYING BANDS TO CIGARS.
APPLICATION FILED SEPT. 12, 1911.

1,101,507.

Patented June 23, 1914.
26 SHEETS—SHEET 2.

W. C. BRIGGS.
MACHINE FOR APPLYING BANDS TO CIGARS.
APPLICATION FILED SEPT. 12, 1911.

1,101,507.

Patented June 23, 1914.
26 SHEETS—SHEET 3.

Inventor
W. C. Briggs

By

His Attorney

W. C. BRIGGS.
MACHINE FOR APPLYING BANDS TO CIGARS.
APPLICATION FILED SEPT. 12, 1911.
1,101,507.
Patented June 23, 1914.
26 SHEETS—SHEET 4.
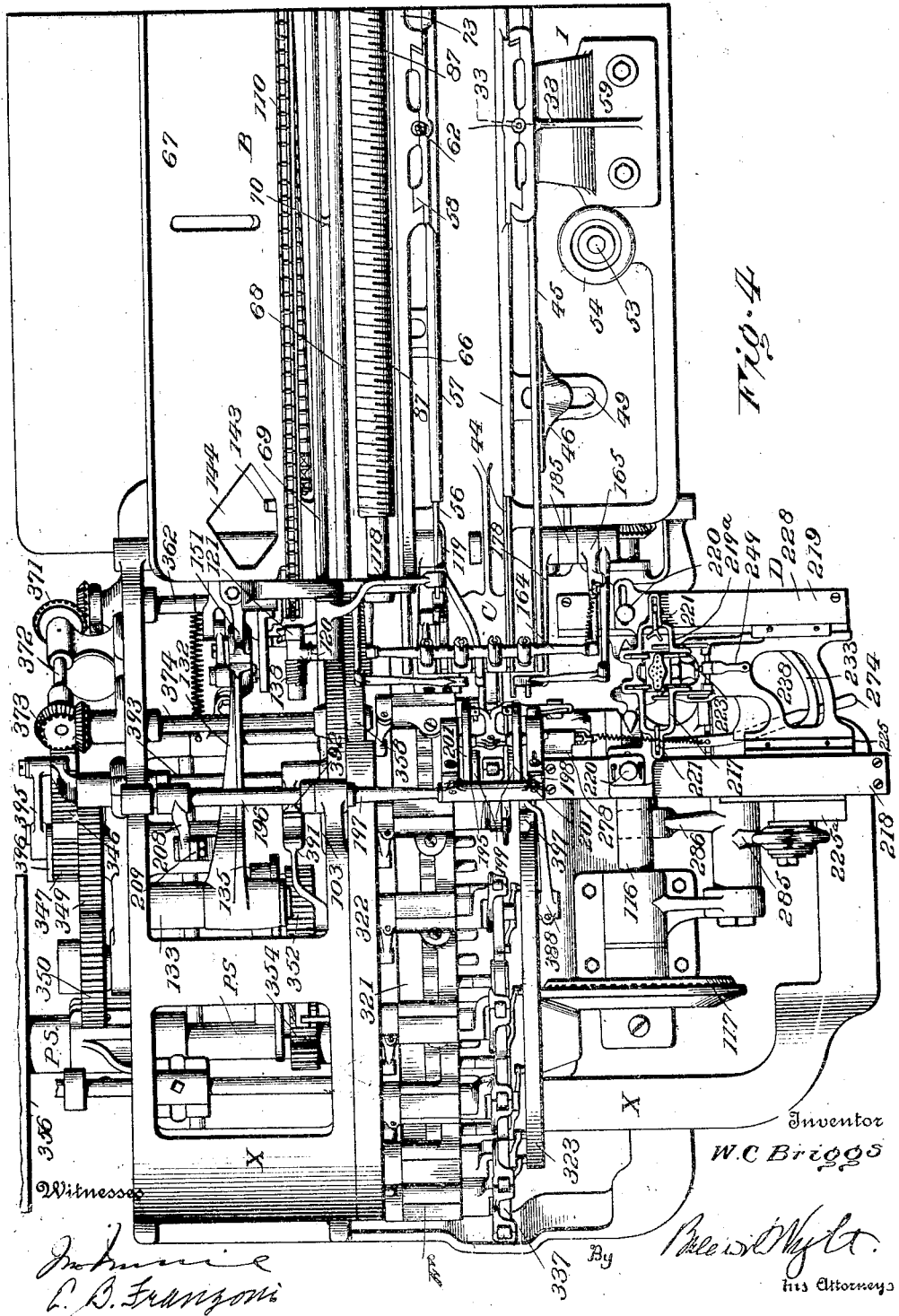

W. C. BRIGGS.
MACHINE FOR APPLYING BANDS TO CIGARS.
APPLICATION FILED SEPT. 12, 1911.
1,101,507.
Patented June 23, 1914.
26 SHEETS—SHEET 5.
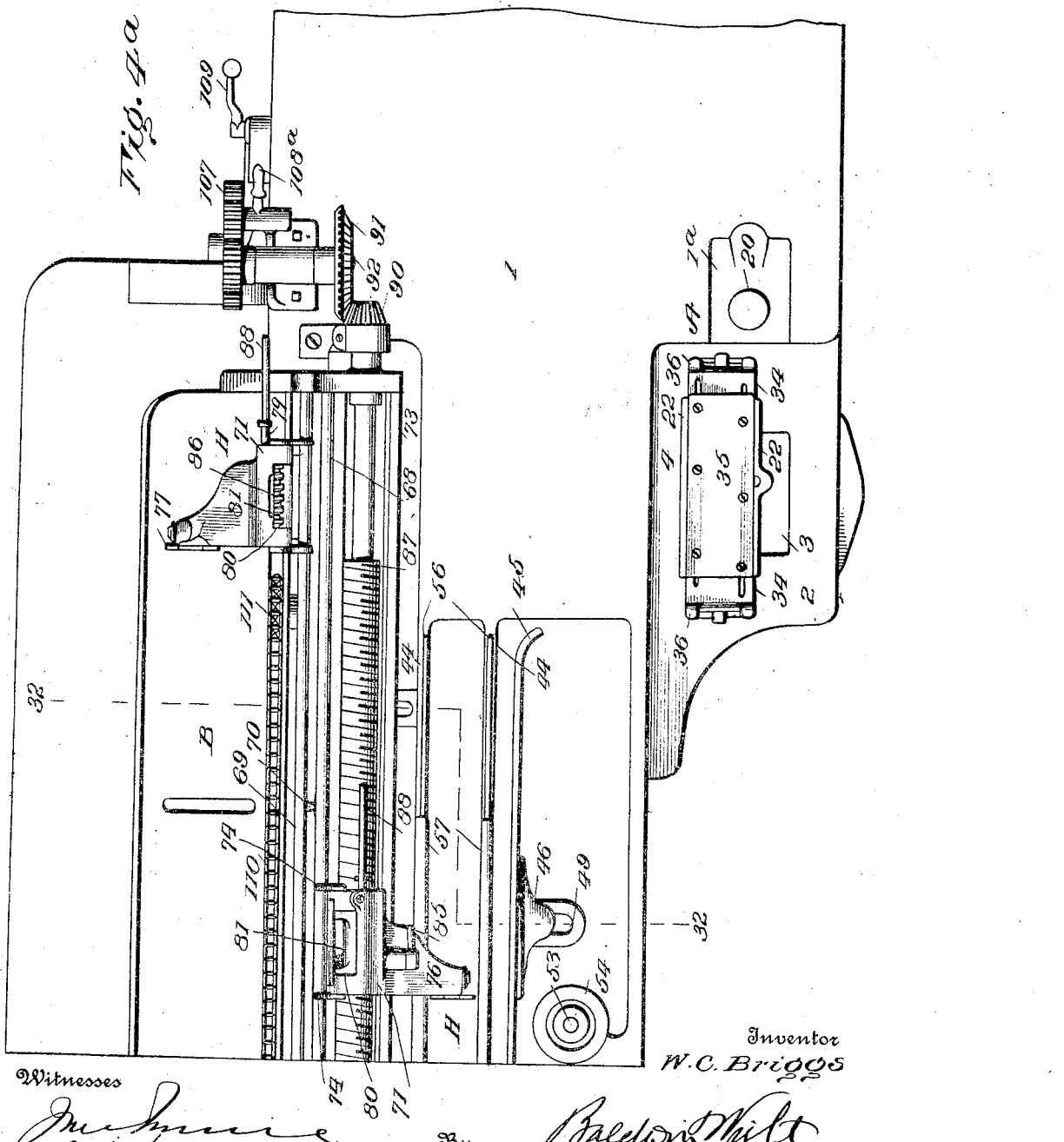

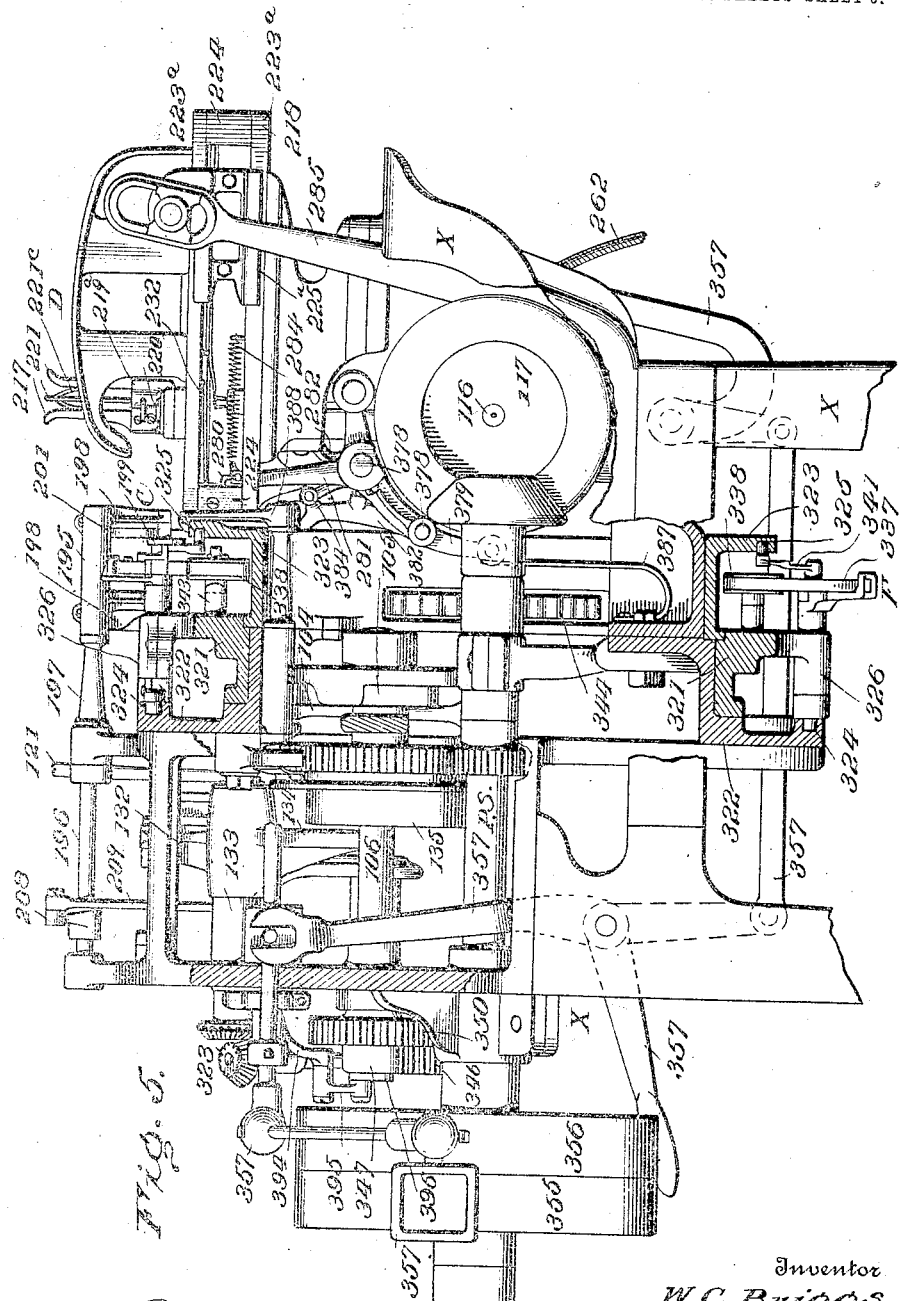

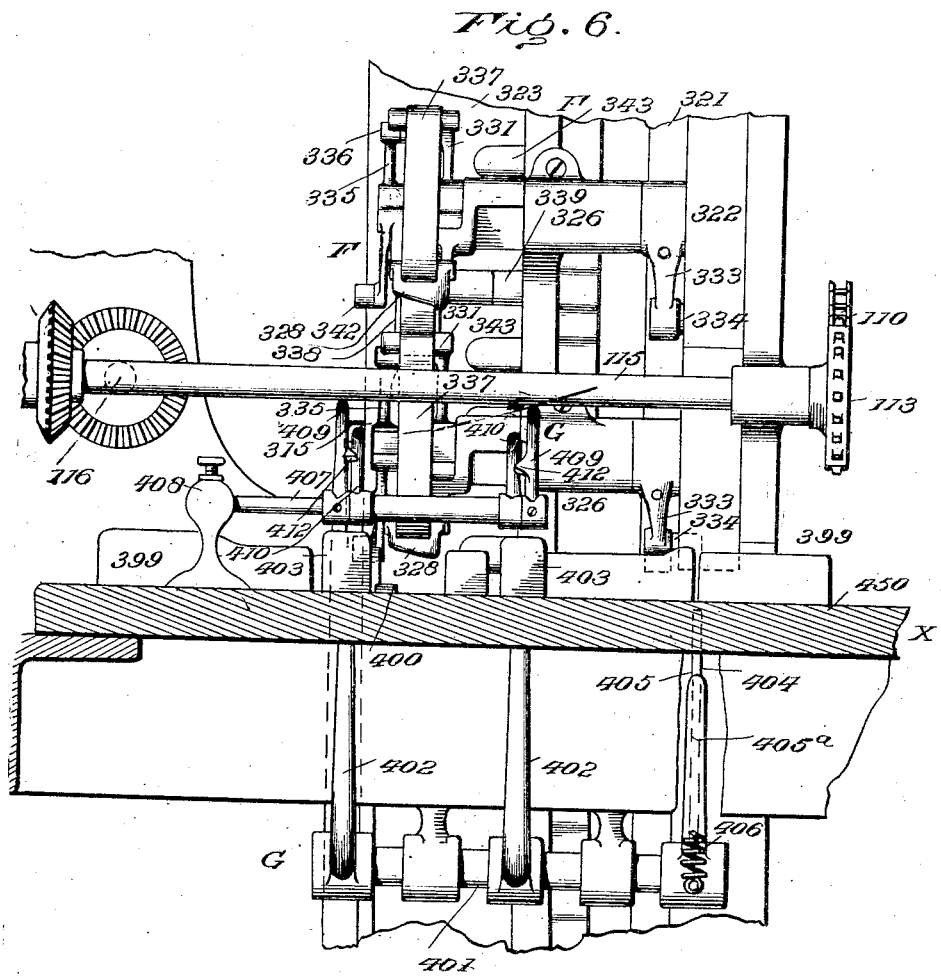

W. C. BRIGGS.
MACHINE FOR APPLYING BANDS TO CIGARS.
APPLICATION FILED SEPT. 12, 1911.

1,101,507.

Patented June 23, 1914.
26 SHEETS—SHEET 8.

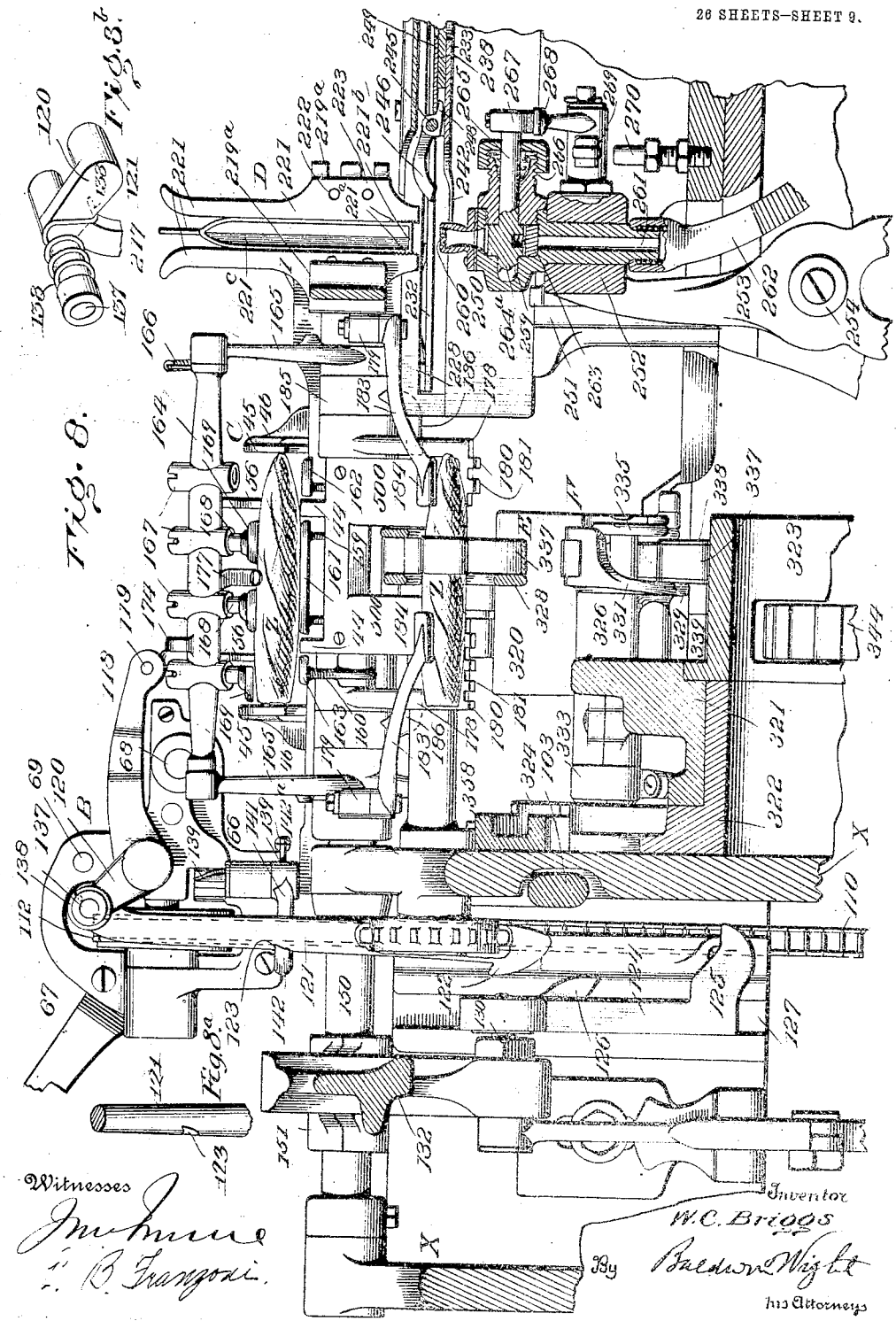

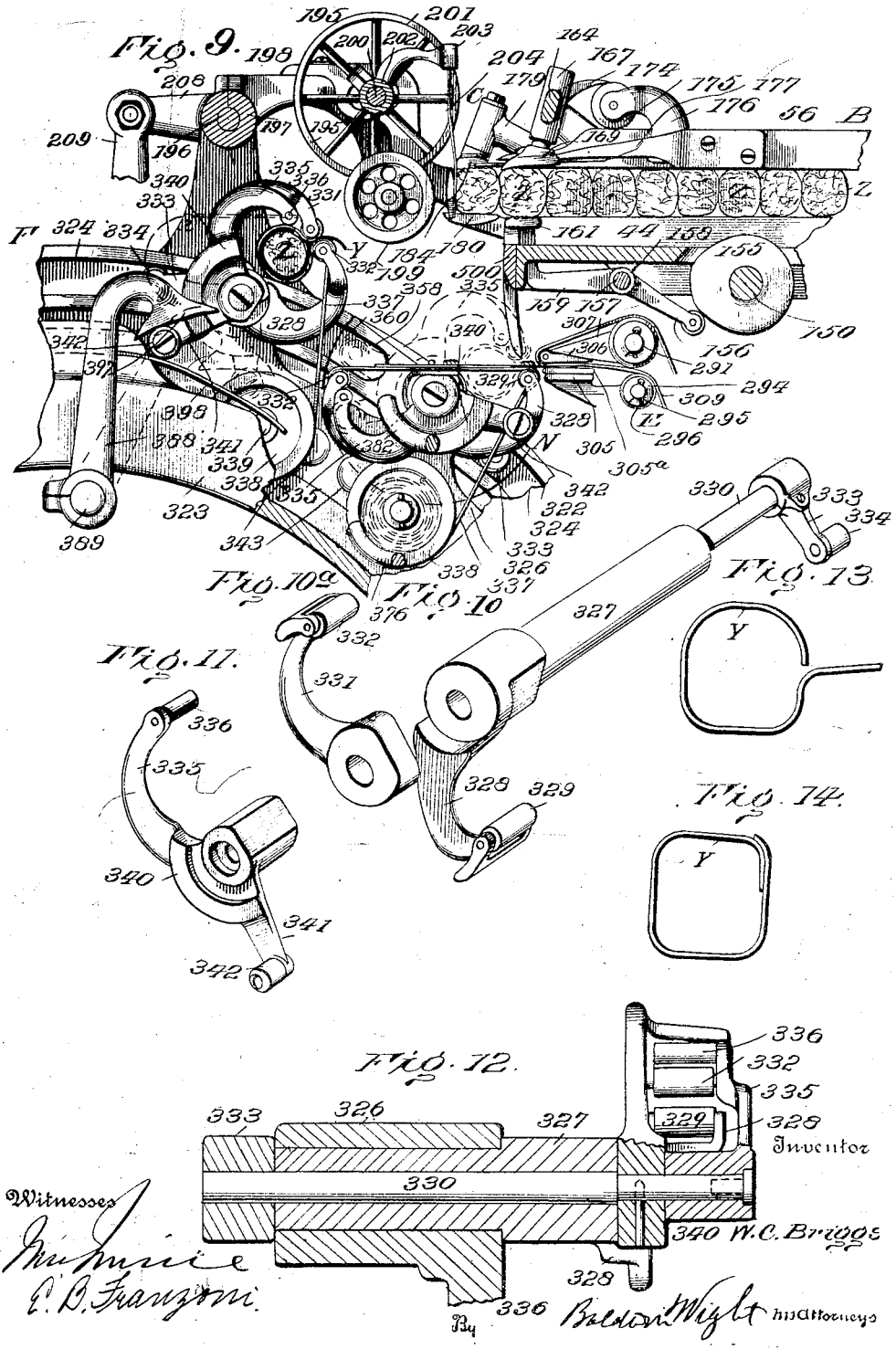

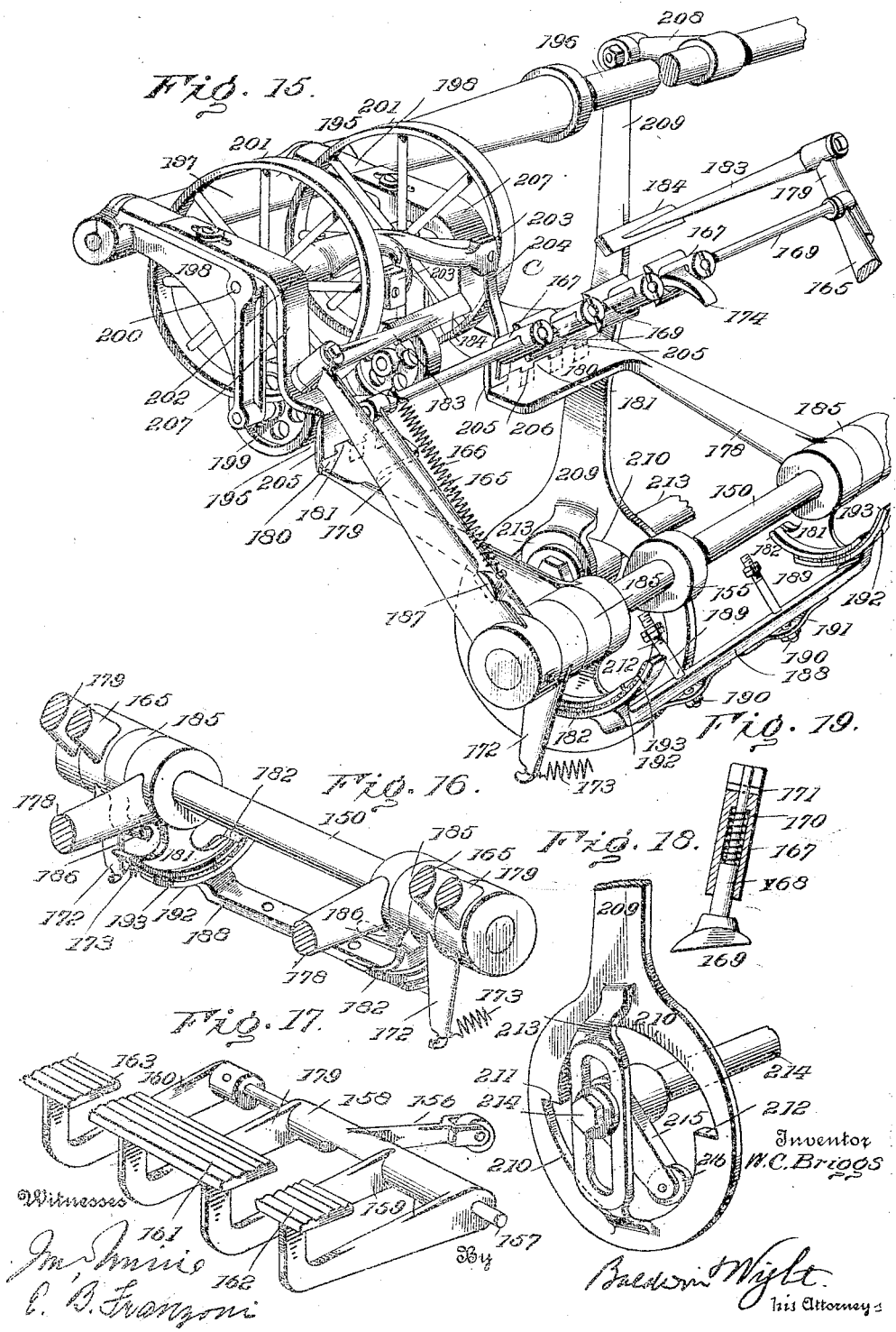

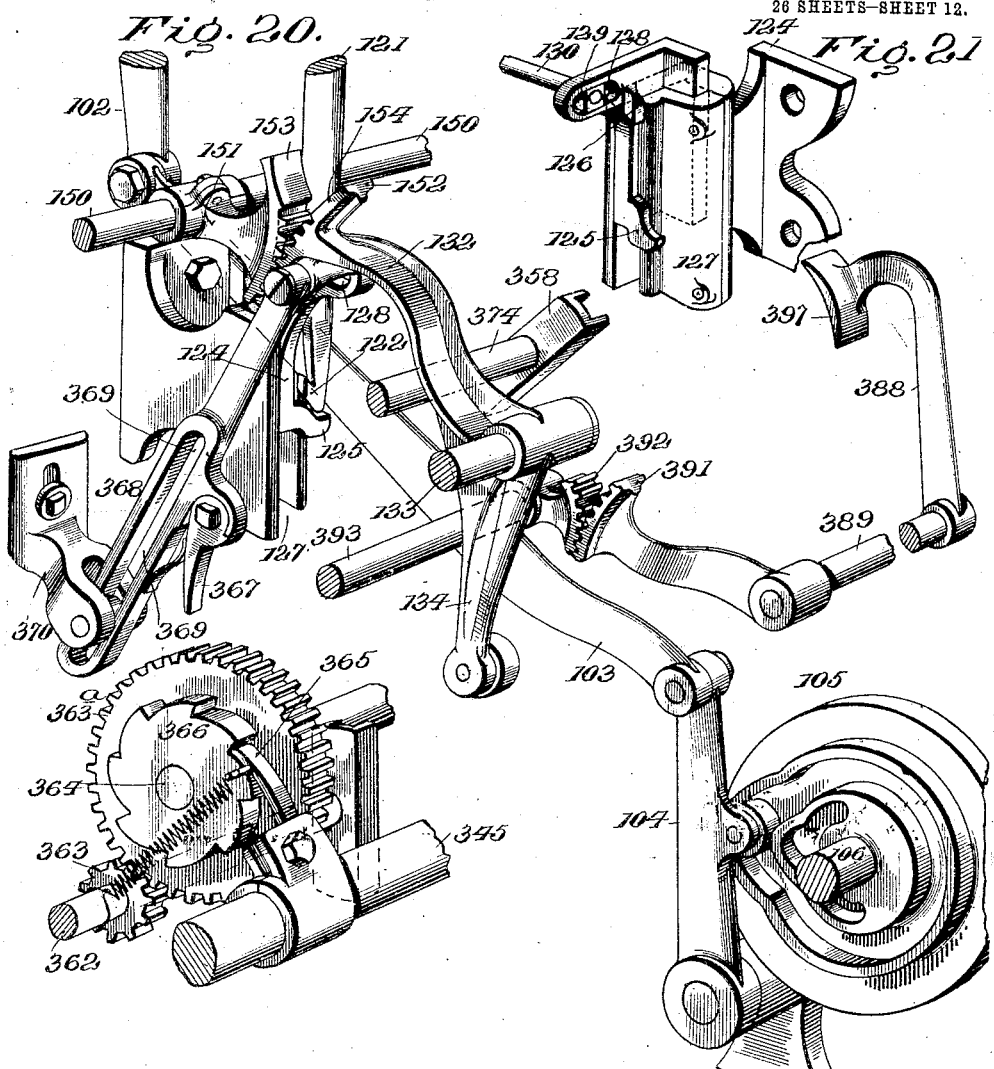
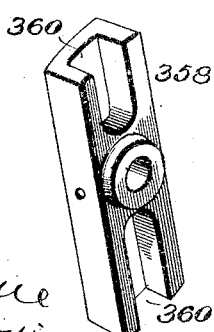
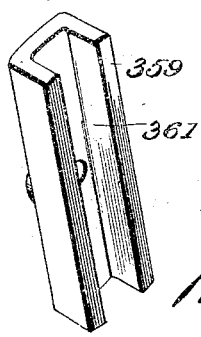

W. C. BRIGGS.
MACHINE FOR APPLYING BANDS TO CIGARS.
APPLICATION FILED SEPT. 12, 1911.
1,101,507. Patented June 23, 1914.
26 SHEETS—SHEET 13.
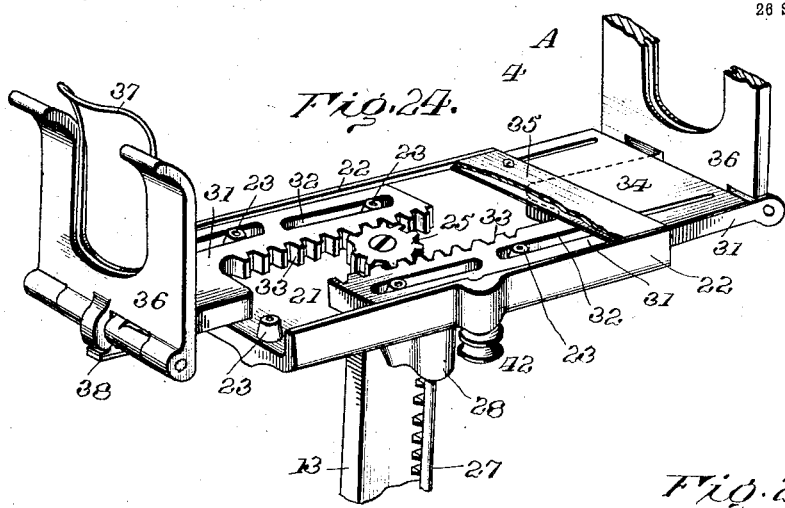
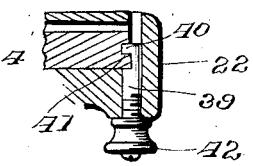
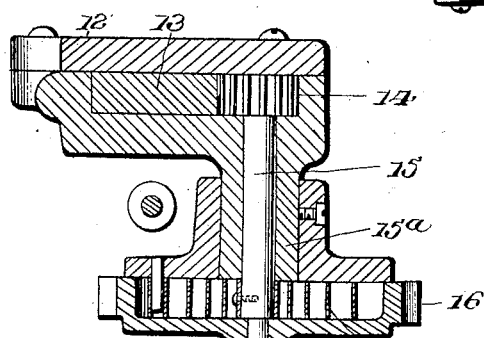
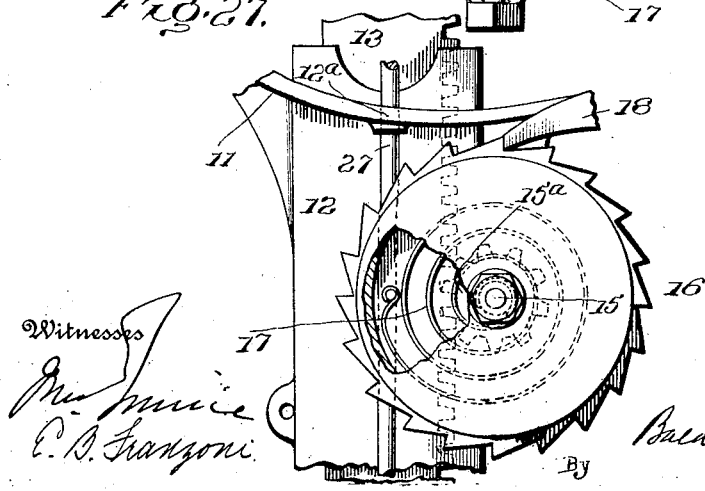
Inventor
W. C. Briggs
By Baldwin Wight his Attorneys
Witnesses

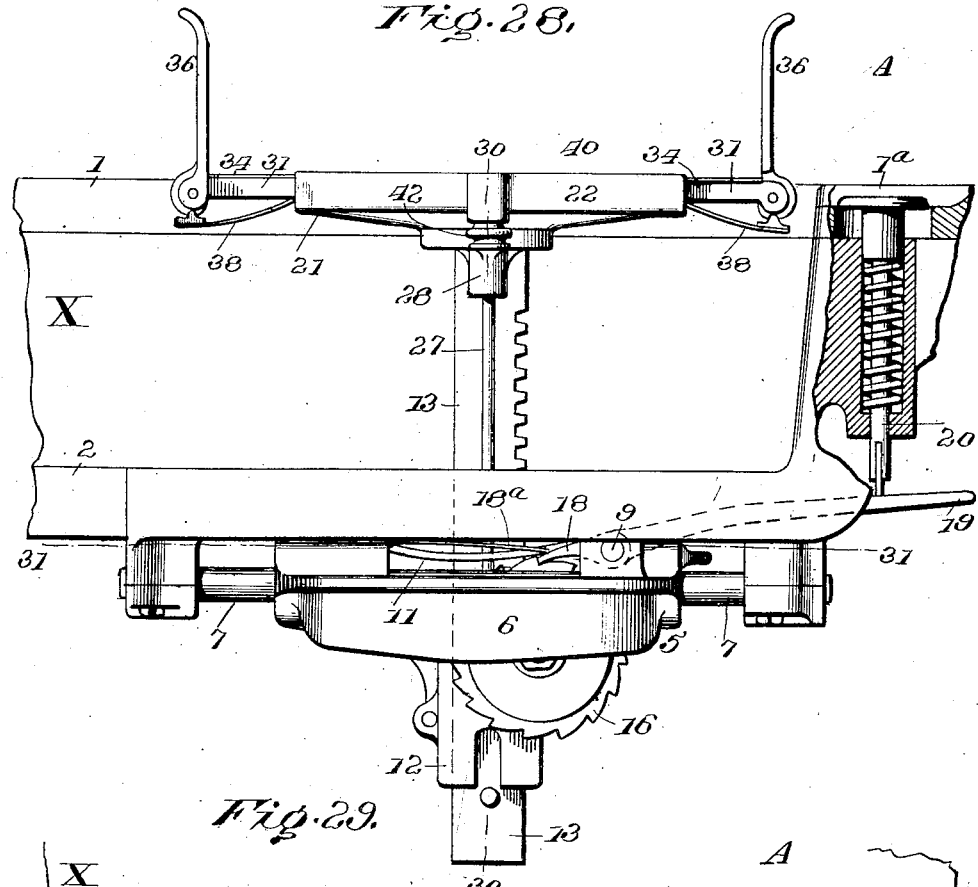
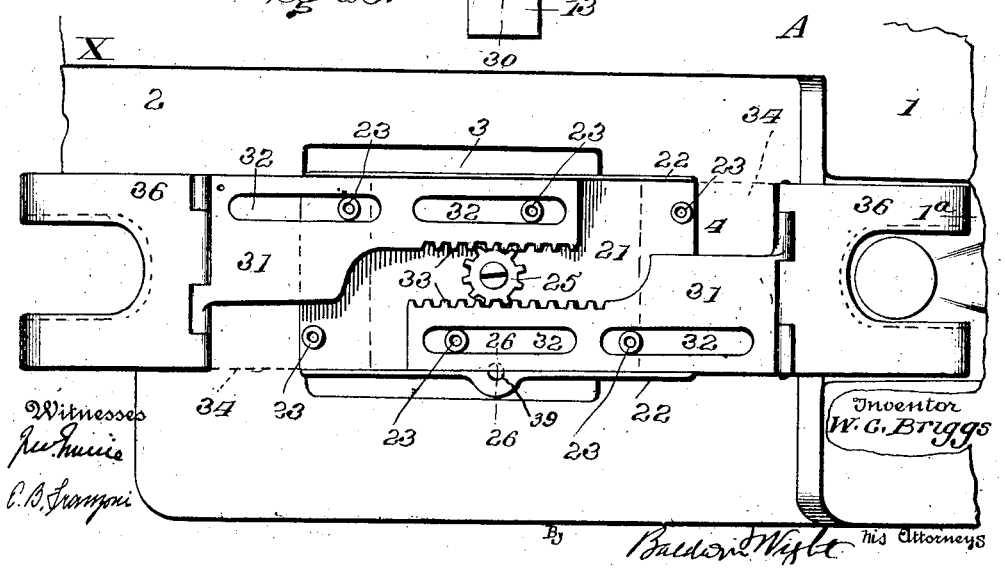

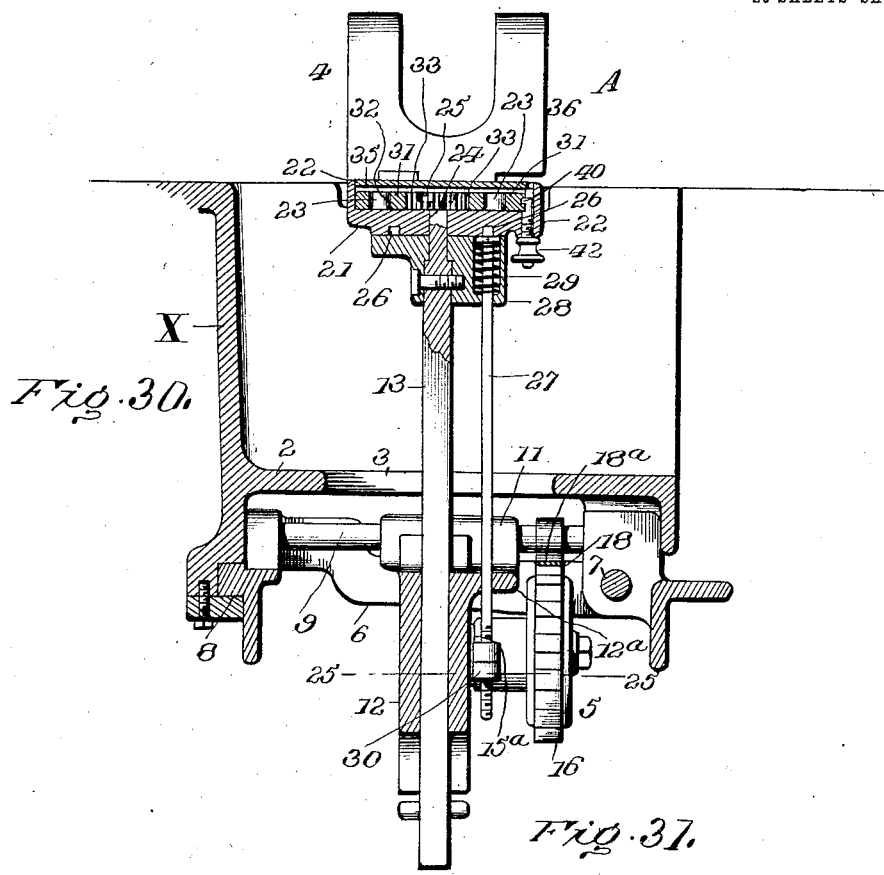
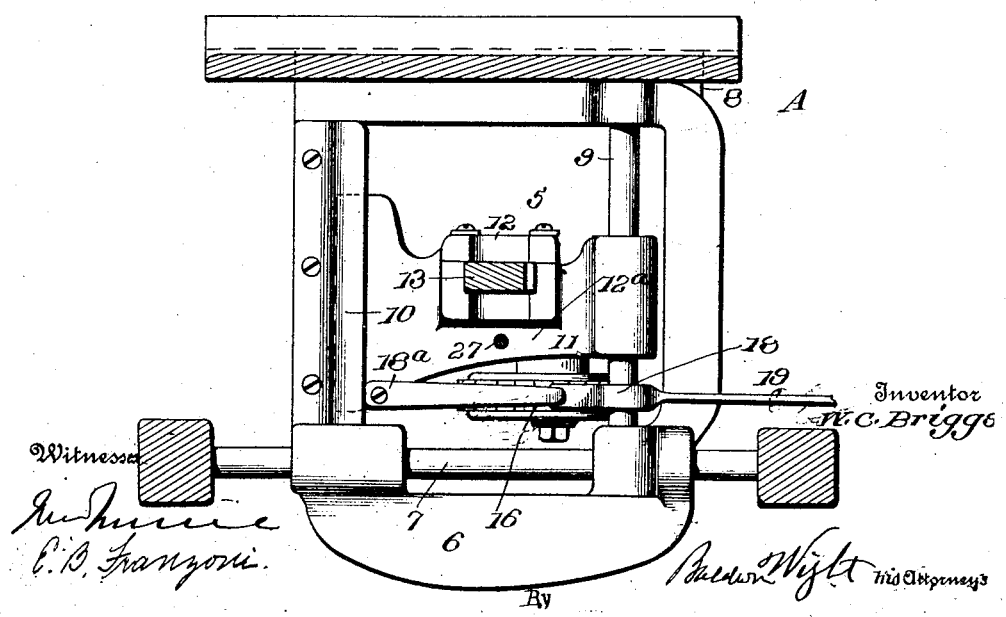

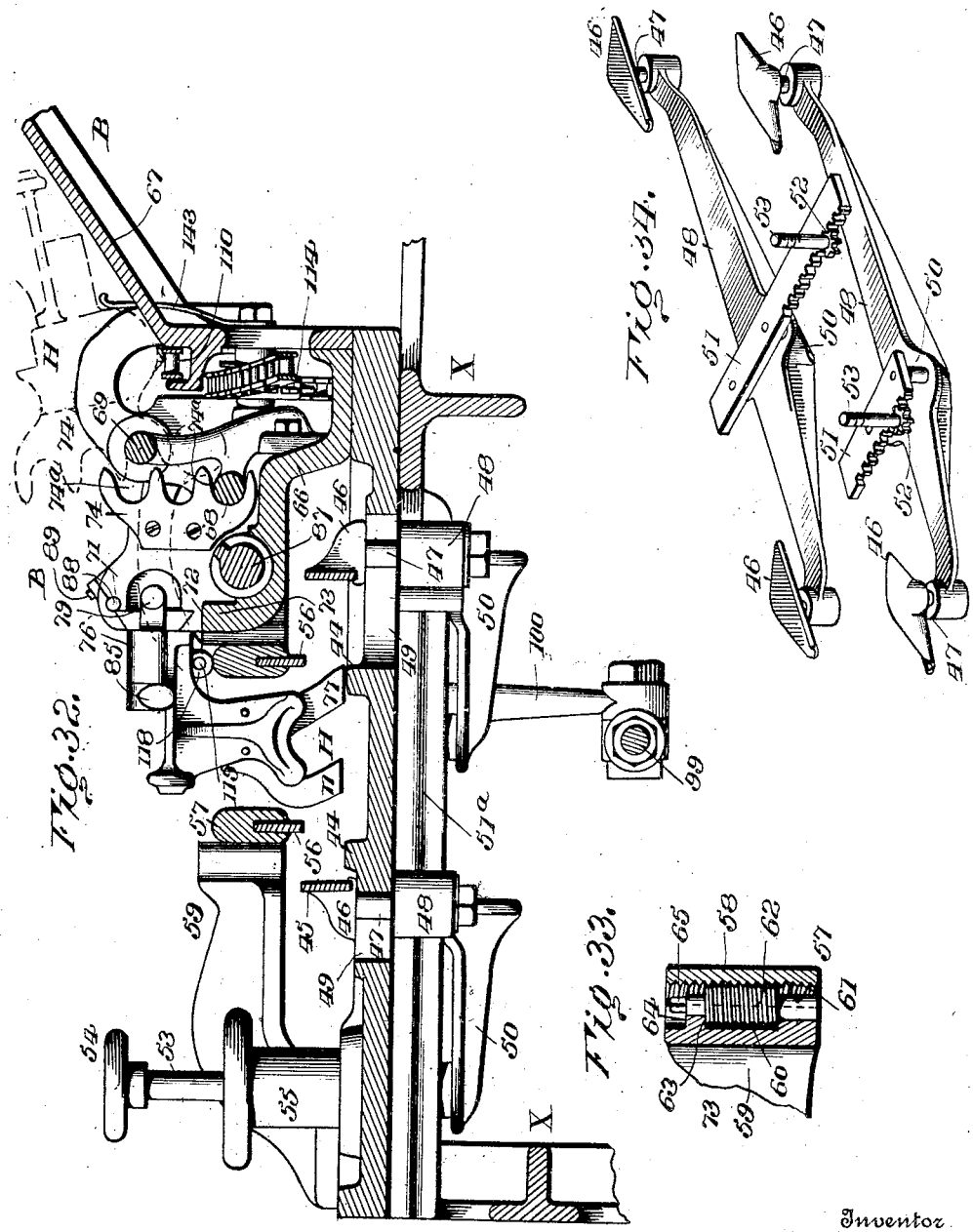

W. C. BRIGGS.
MACHINE FOR APPLYING BANDS TO CIGARS.
APPLICATION FILED SEPT. 12, 1911.
1,101,507.
Patented June 23, 1914.
26 SHEETS—SHEET 17.
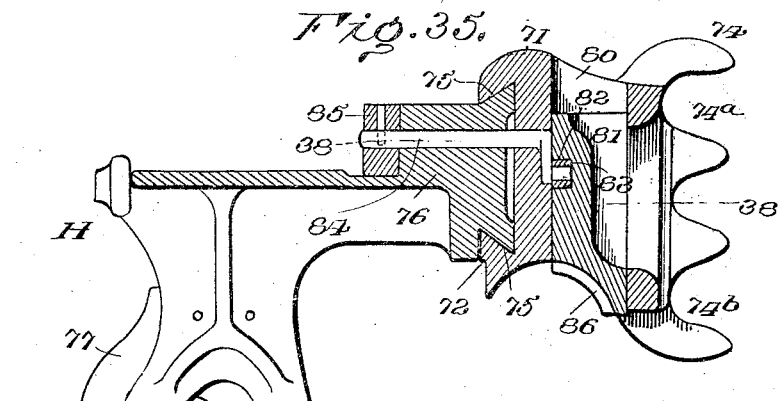
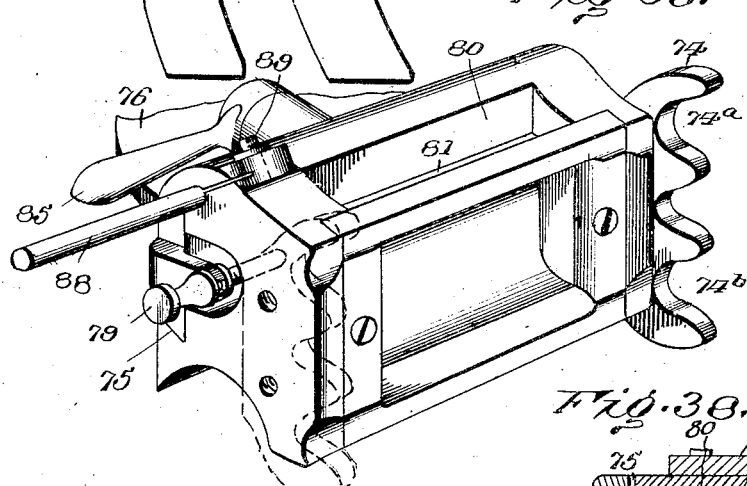
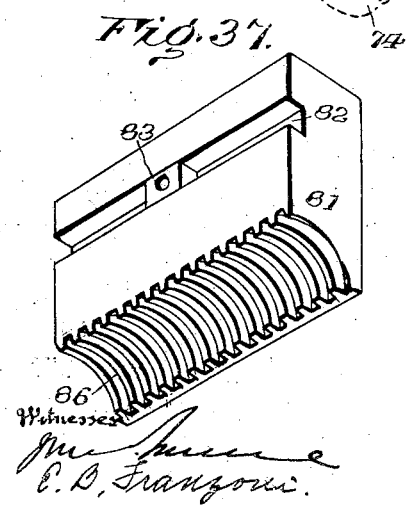
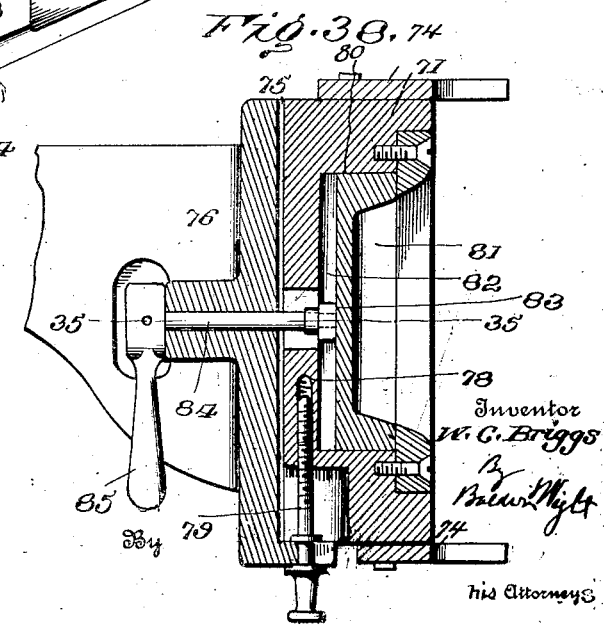

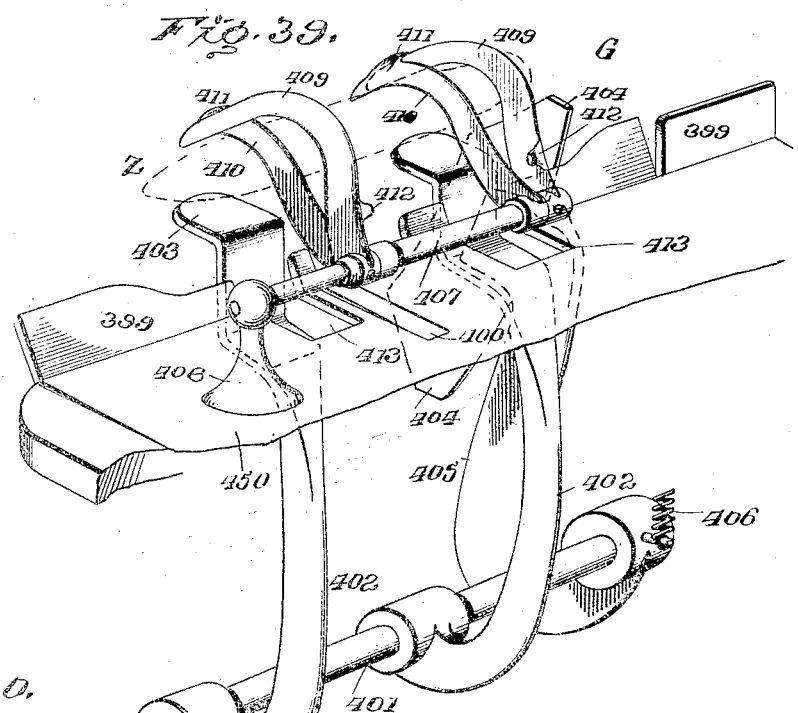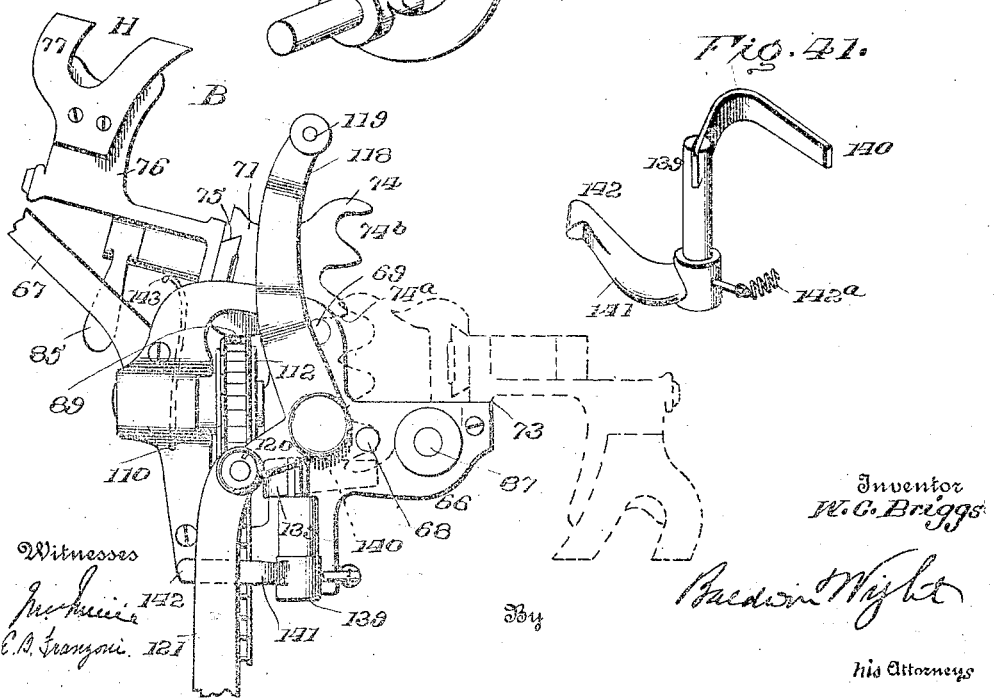

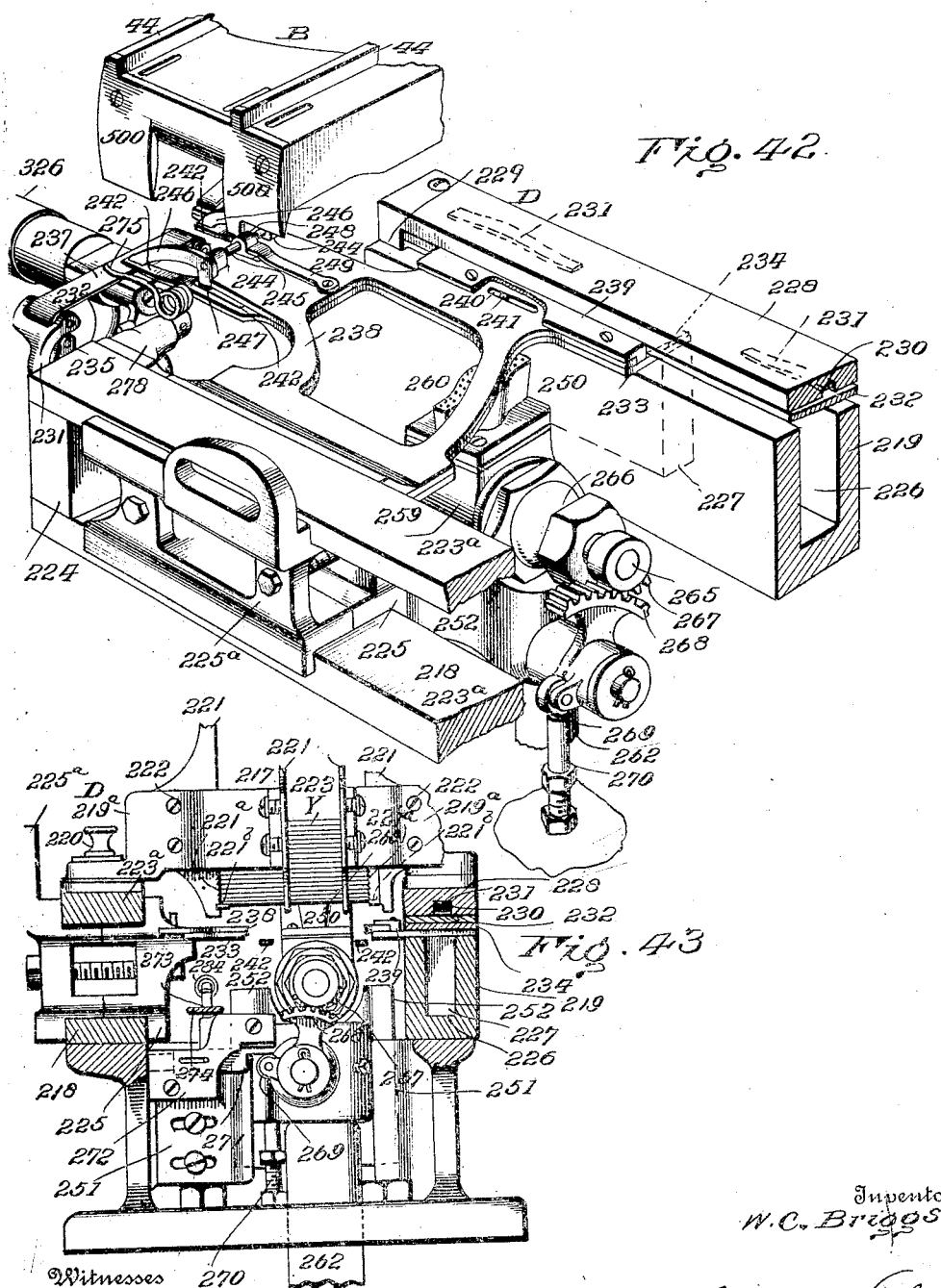

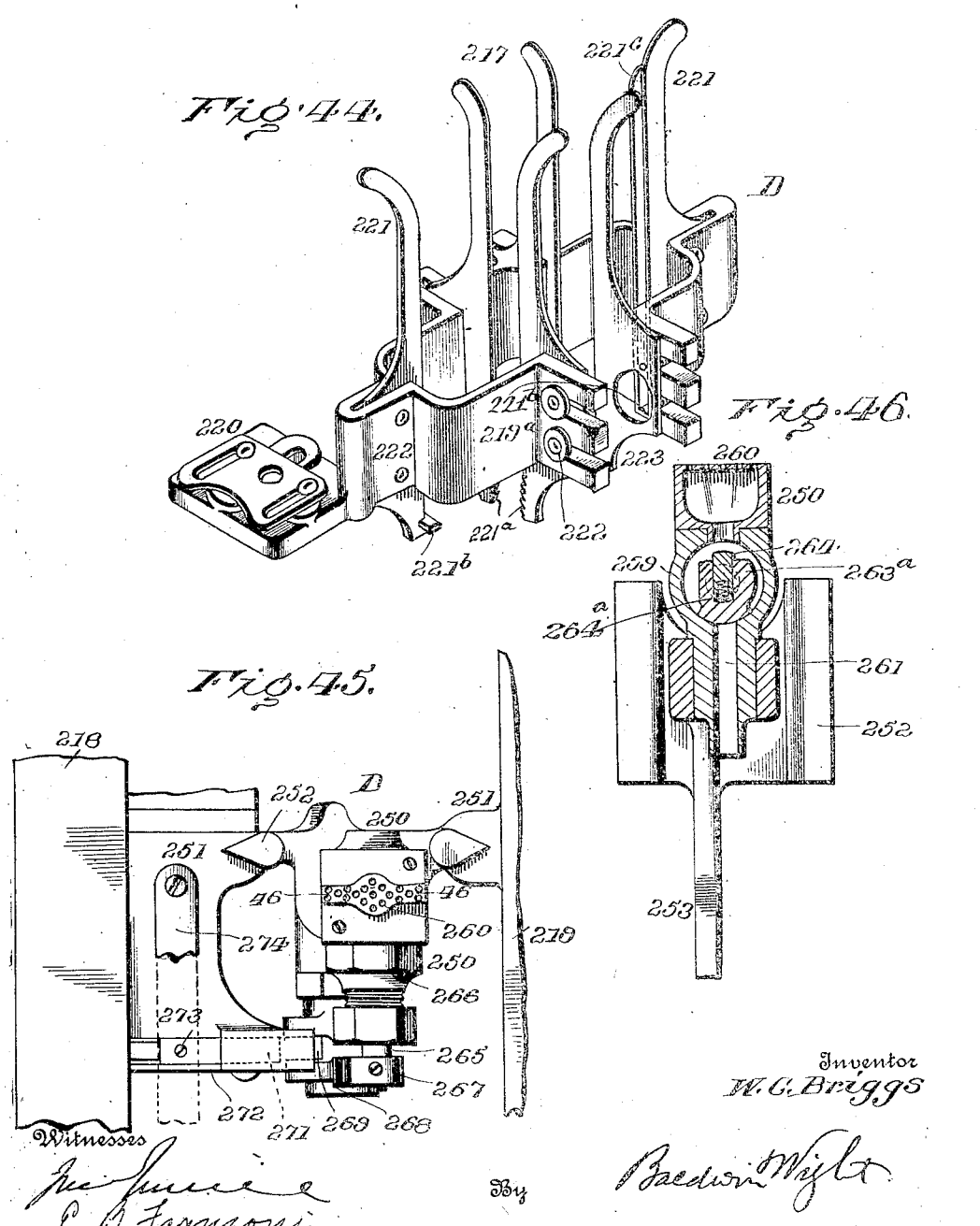

W. C. BRIGGS.
MACHINE FOR APPLYING BANDS TO CIGARS.
APPLICATION FILED SEPT. 12, 1911.
1,101,507.
Patented June 23, 1914.
26 SHEETS—SHEET 21.
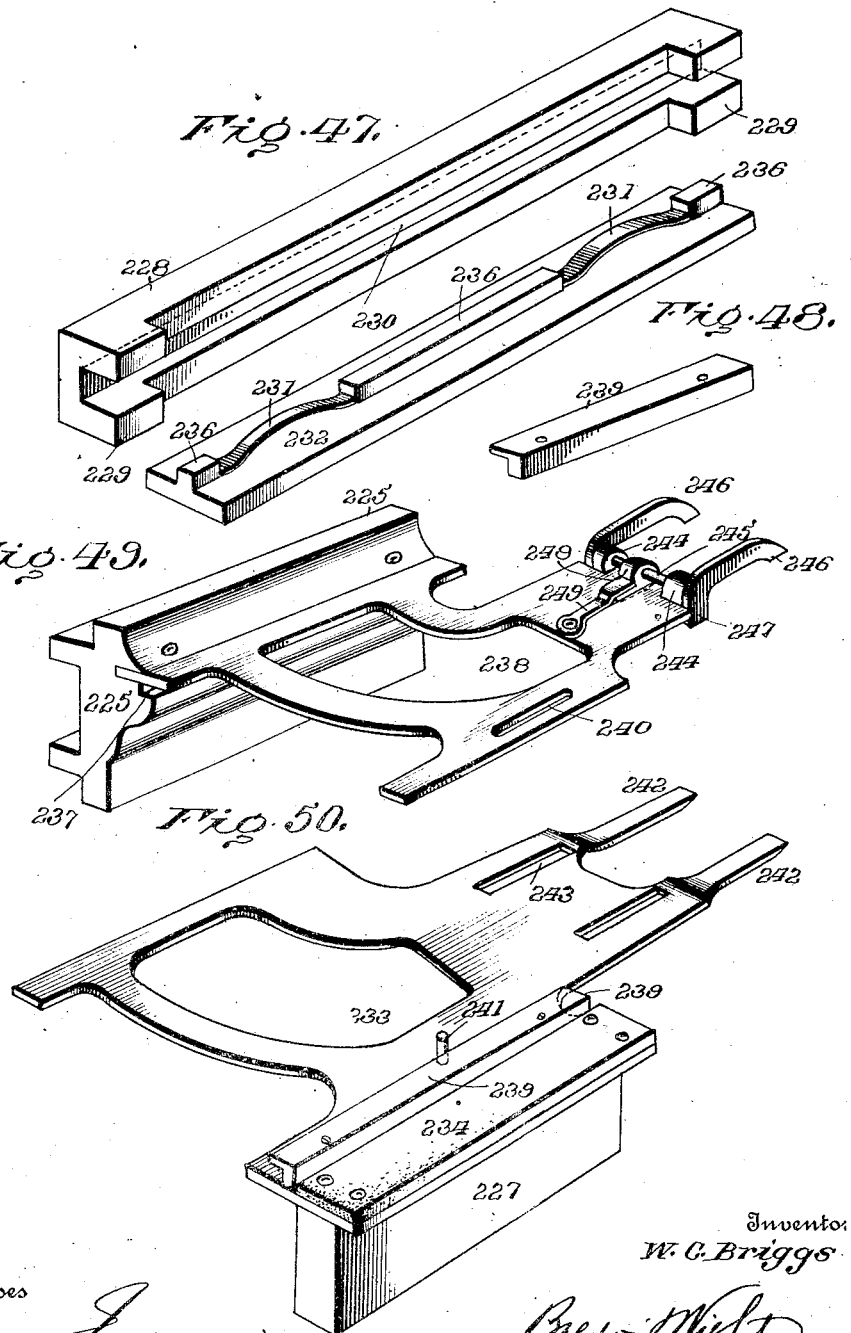
Witnesses
Inventor
W. C. Briggs W. C. BRIGGS.
MACHINE FOR APPLYING BANDS TO CIGARS.
APPLICATION FILED SEPT. 12, 1911.
1,101,507.
Patented June 23, 1914.
26 SHEETS—SHEET 22.
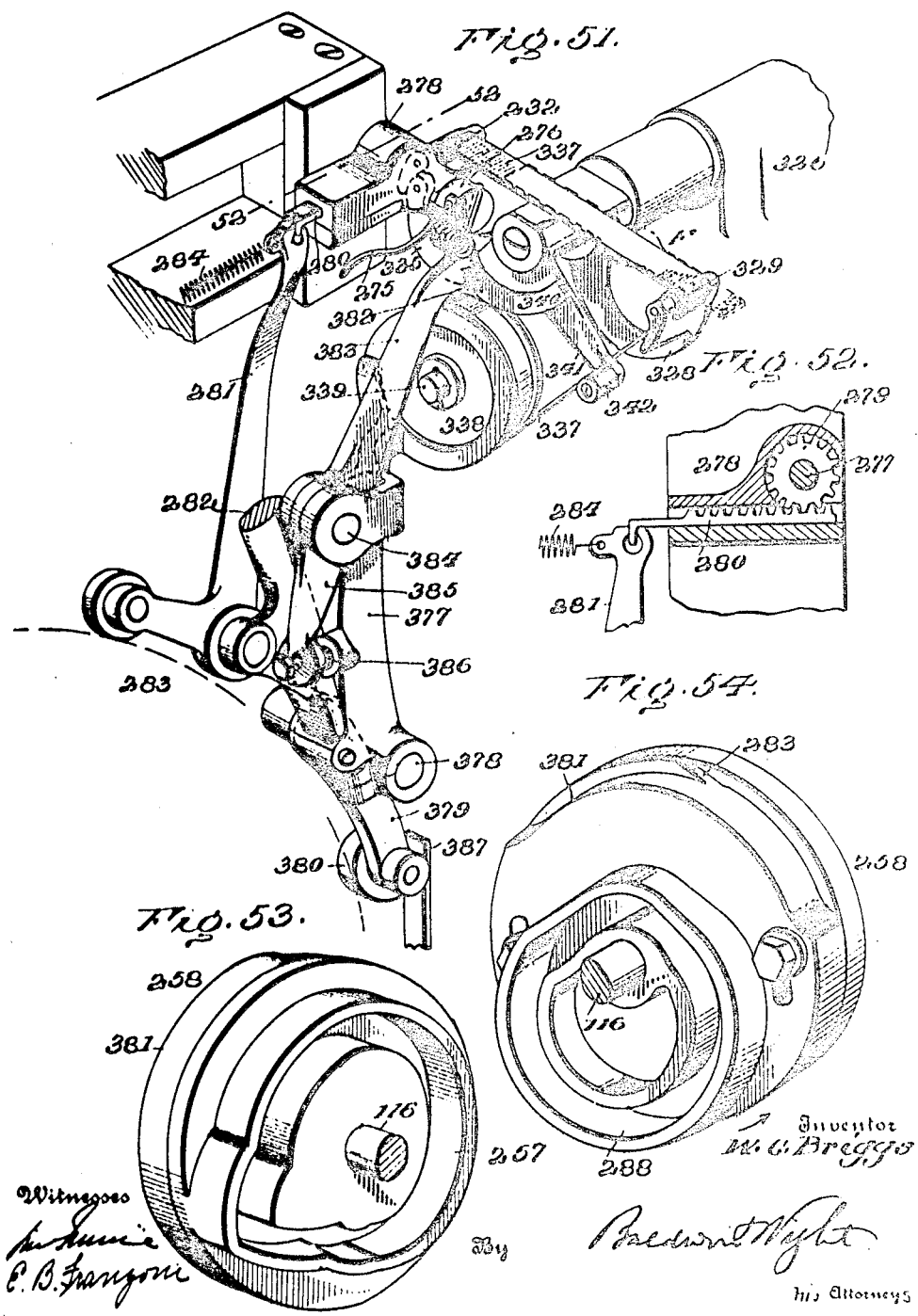

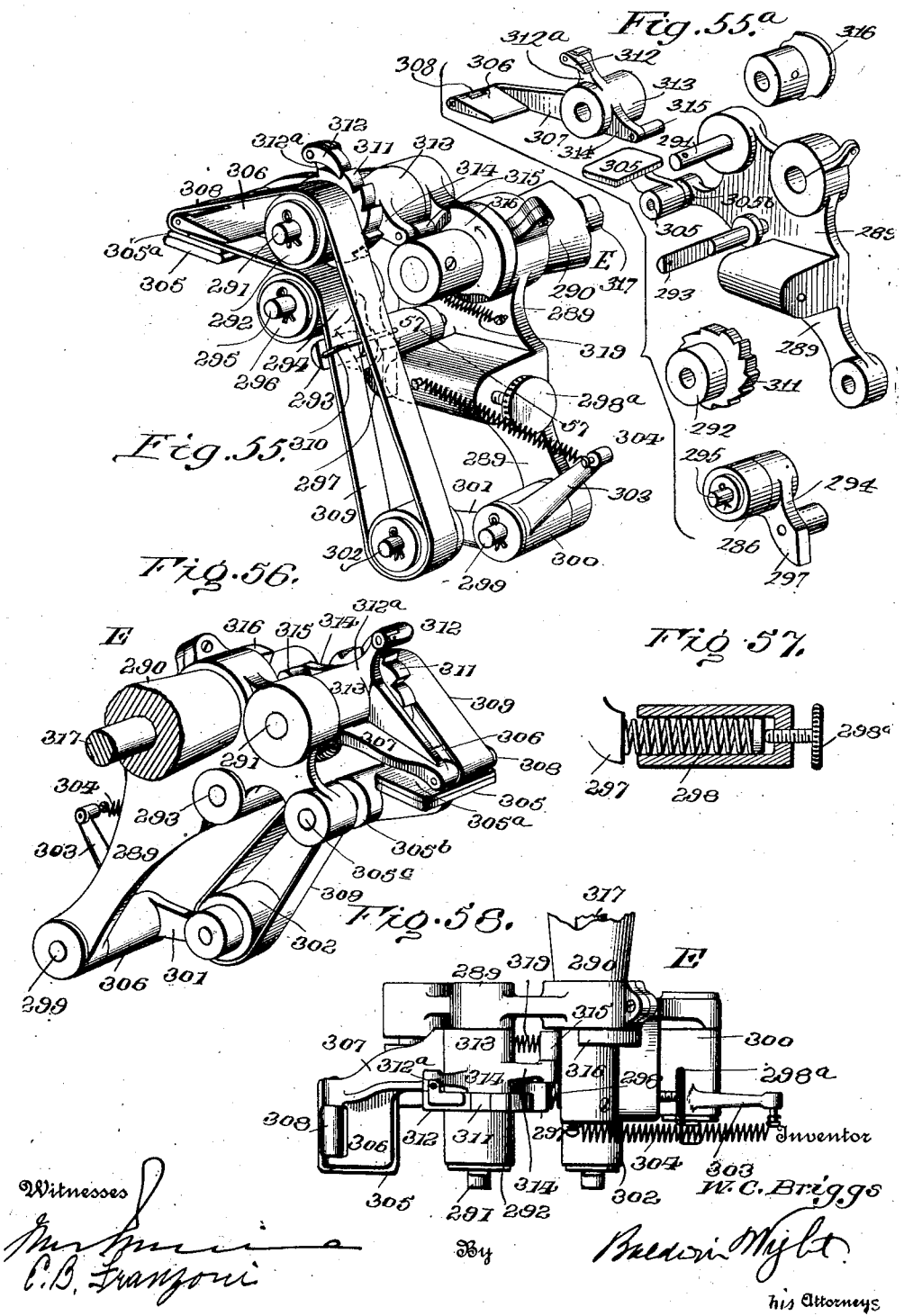

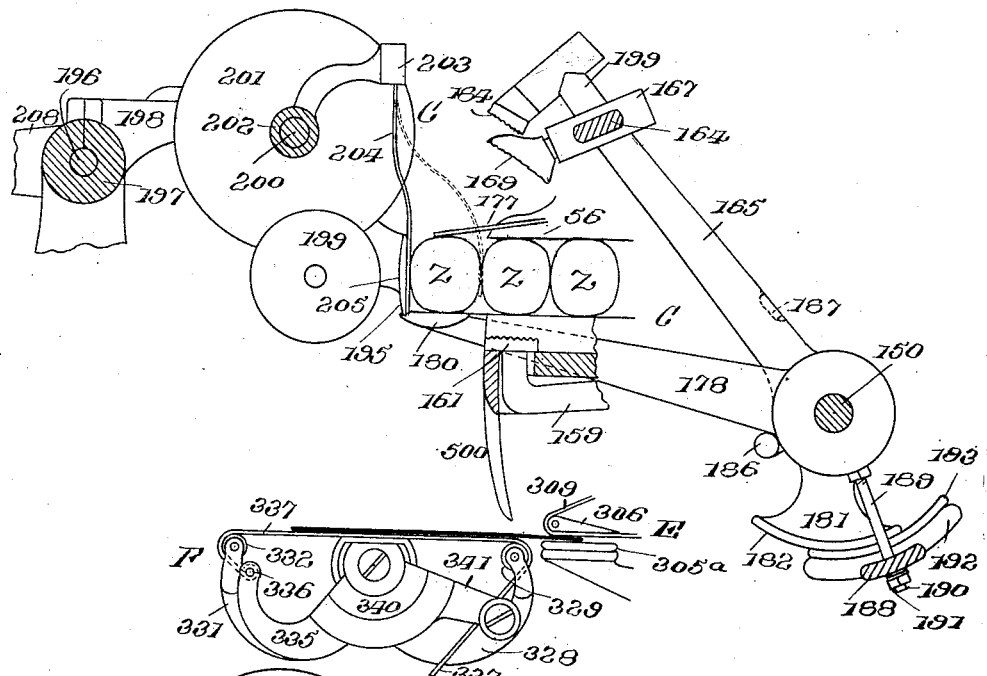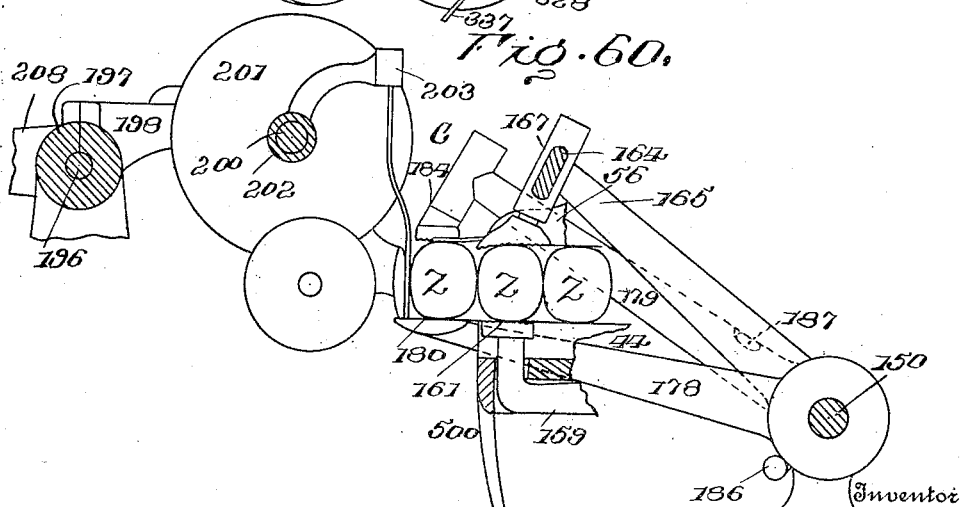

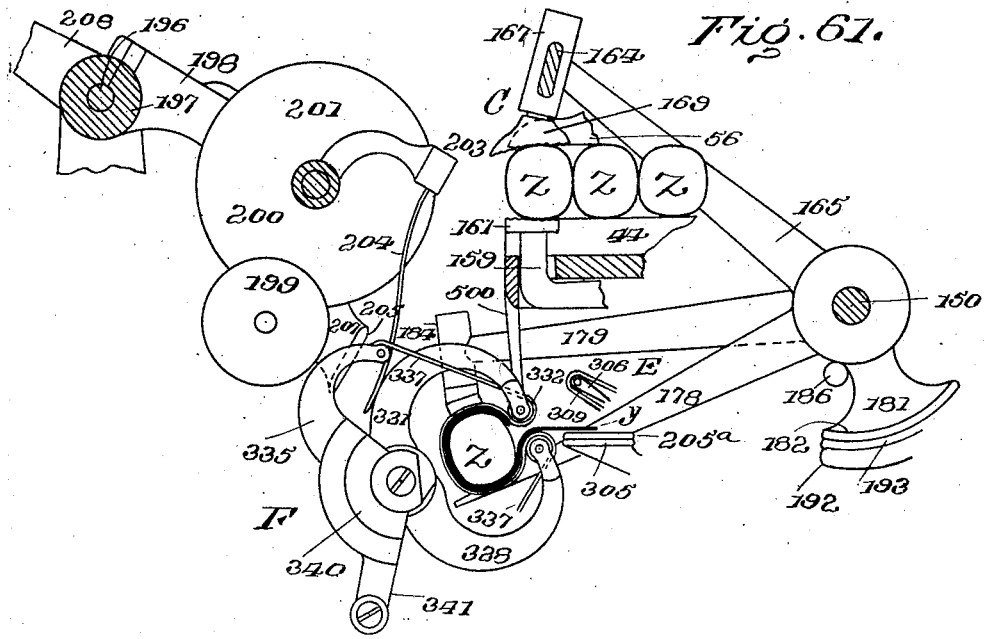
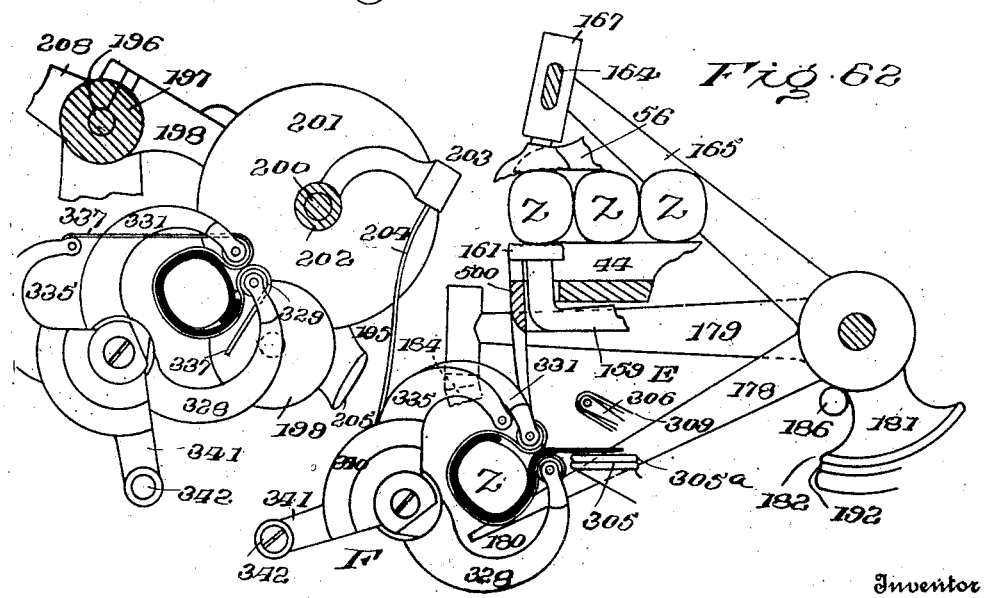

W. C. BRIGGS.
MACHINE FOR APPLYING BANDS TO CIGARS.
APPLICATION FILED SEPT. 12, 1911.

1,101,507.

Patented June 23, 1914.
26 SHEETS—SHEET 26.

Witnesses

Inventor
W. C. Briggs
By Baldwin Wight
his Attorneys

UNITED STATES PATENT OFFICE.

WILLIAM CYRUS BRIGGS, OF WINSTON-SALEM, NORTH CAROLINA, ASSIGNOR TO CAROLINA BANDING MACHINE COMPANY, OF WINSTON-SALEM, NORTH CAROLINA, A CORPORATION OF NORTH CAROLINA.

MACHINE FOR APPLYING BANDS TO CIGARS.

1,101,507.  Specification of Letters Patent.  Patented June 23, 1914.

Application filed September 12, 1911. Serial No. 648,830.

*To all whom it may concern:*

Be it known that I, WILLIAM CYRUS BRIGGS, a citizen of the United States, residing in Winston-Salem, in the county of Forsyth and State of North Carolina, have invented certain new and useful Improvements in Machines for Applying Bands to Cigars, of which the following is a specification.

My invention relates to machines especially adapted to apply bands or labels to cigars of the general kind shown in Letters Patent of the United States heretofore granted to me as follows:—No. 762,681, dated June 14, 1904, and No. 764,707, dated July 12, 1904.

In the machine of my former patents bands were printed on a strip or ribbon of indefinite length and this strip was severed into suitable lengths for banding the cigars. As the bands were fed to the wrapping devices paste was applied to one end of each band and the band was delivered upon the top of an endless wrapping tape. The cigars were fed by an endless carrier chain or conveyer toward the wrapping mechanism and in the machine of the second mentioned patent were transferred from the carrier to the wrapping mechanism by devices which caused them to be delivered evenly and gently one at a time upon the top of the endless wrapping tape, then the tape was slackened to form a pocket which received a cigar and then an endwise movement was given to the tape which caused the band to be wrapped around the cigar.

In my Patent No. 1,004,141 of Sept. 26, 1911, I have shown a machine for the same purpose in which the cigars are fed from a hopper to wrapping devices by a pocketed drum which delivers them one at a time to mechanism which carries them to wrapping devices which differ considerably in construction from those shown in my before mentioned patents. In the machine of Patent No. 1,004,141 a series of wrapping devices are carried by an intermittently rotating drum. Each wrapping device consists of a tape carried by arms which are operated to form a pocket in the tape inclosing the cigar and in the band which the tape has previously received. The tapes are operated to rotate the cigars and bands and thus firmly apply the latter to the former. In the machine of my said Patent No. 1,004,141 the bands instead of being taken from a strip of indefinite length are all cut to the proper size and stacked in a pile from which they are taken one at a time and fed to the wrapping devices.

All of the machines above described were designed to apply the bands to the cigars before they were packed or pressed and while said machines efficiently and rapidly banded the cigars, it was found that when the cigars were subsequently packed in boxes and then pressed, as is commonly done, the bands would be often displaced so that an irregular arrangement thereof would render the appearance of the banded cigars unattractive.

When cigars are banded by hand it is now customary to first pack them in boxes and then subject them to pressure to cause them to adapt themselves to each other. This operation tends to flatten the cigars and render them somewhat irregular in shape. After this operation the cigars are removed from the boxes and bands are applied by hand, care being taken to position each band centrally on the cigar so that when the cigars are again packed in the box the bands will all be in alinement and the medallions or prominent parts of the bands will be uppermost and exposed to view when the box is opened. It is also the custom to place the banded cigars in the box in precisely the same order in which they were first placed therein so that they shall occupy the same positions that they occupied when pressed in order that they may properly fit together and present a compact and pleasing appearance.

The object of my present invention is to provide means for applying bands to cigars after they have been packed and pressed and in such manner that the bands may be regularly and evenly applied so that after being banded they may be properly returned to the box and so arranged therein as to uniformly aline the bands.

Machines embodying my improvements are especially designed to apply bands to cigars but contain mechanisms which are adapted to apply bands or labels to various other articles, and it will be understood that my claims are not limited to means arranged to apply bands to cigars, however, for convenience I have shown and will describe the machine as constructed and used for banding cigars.

The machine comprises, generally stated, mechanism for receiving a plurality of rows of cigars from a box and placing these rows successively in line with a platform over which they are moved to mechanism which feeds the rows of cigars to devices which carry the cigars one at a time to band-applying devices to which bands are previously supplied and which wrap the bands around the cigars and carry them to a shelf onto which the banded cigars are discharged. The bands are fed by mechanism similar to that shown in my Patent No. 1,004,141 before mentioned and the paste-carrying ends of the bands are moistened after they are delivered to the band-applying devices and before the latter are operated to apply the bands to the cigars.

The mechanism is so organized and operated that after the cigars are received by the feeders they are automatically carried through the machine and automatically have bands applied thereto without any manipulation of either the cigars or the bands by the operator or attendant, and the banded cigars are automatically discharged onto a receiving platform or shelf from which they are transferred by an attendant to the box from which they were taken, (or other similar box) in such manner that the bands will be in perfect alinement and the medallions will all appear on the upper or exposed sides of the cigars, the latter properly fitting together in the same way as that in which they were arranged before they were taken from the box.

The machine involves many novel organizations of instrumentalities and numerous details of construction which are believed to be new and which will be hereinafter described and claimed.

Figure 2:
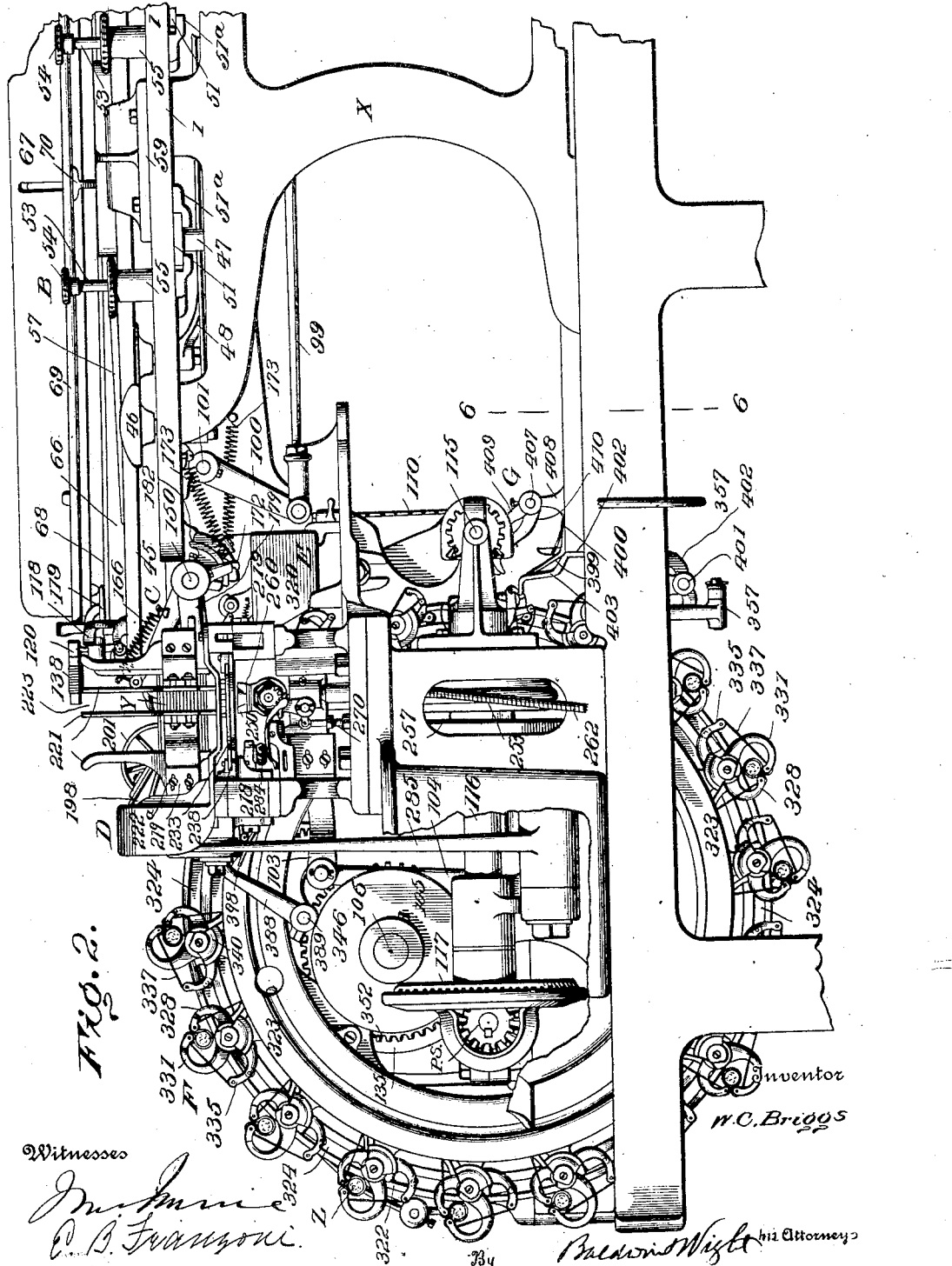
Figure 3:
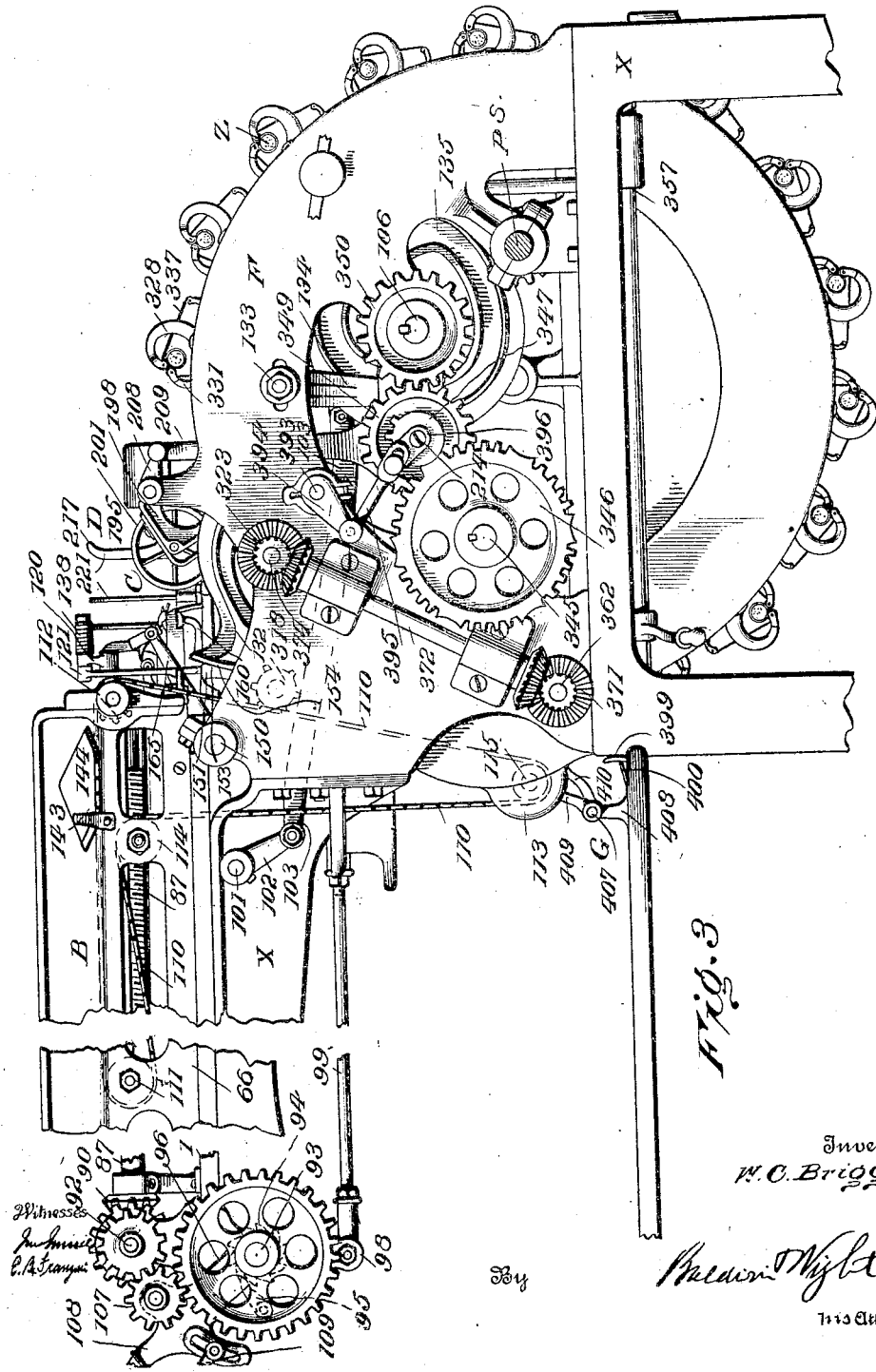
Figure 7:
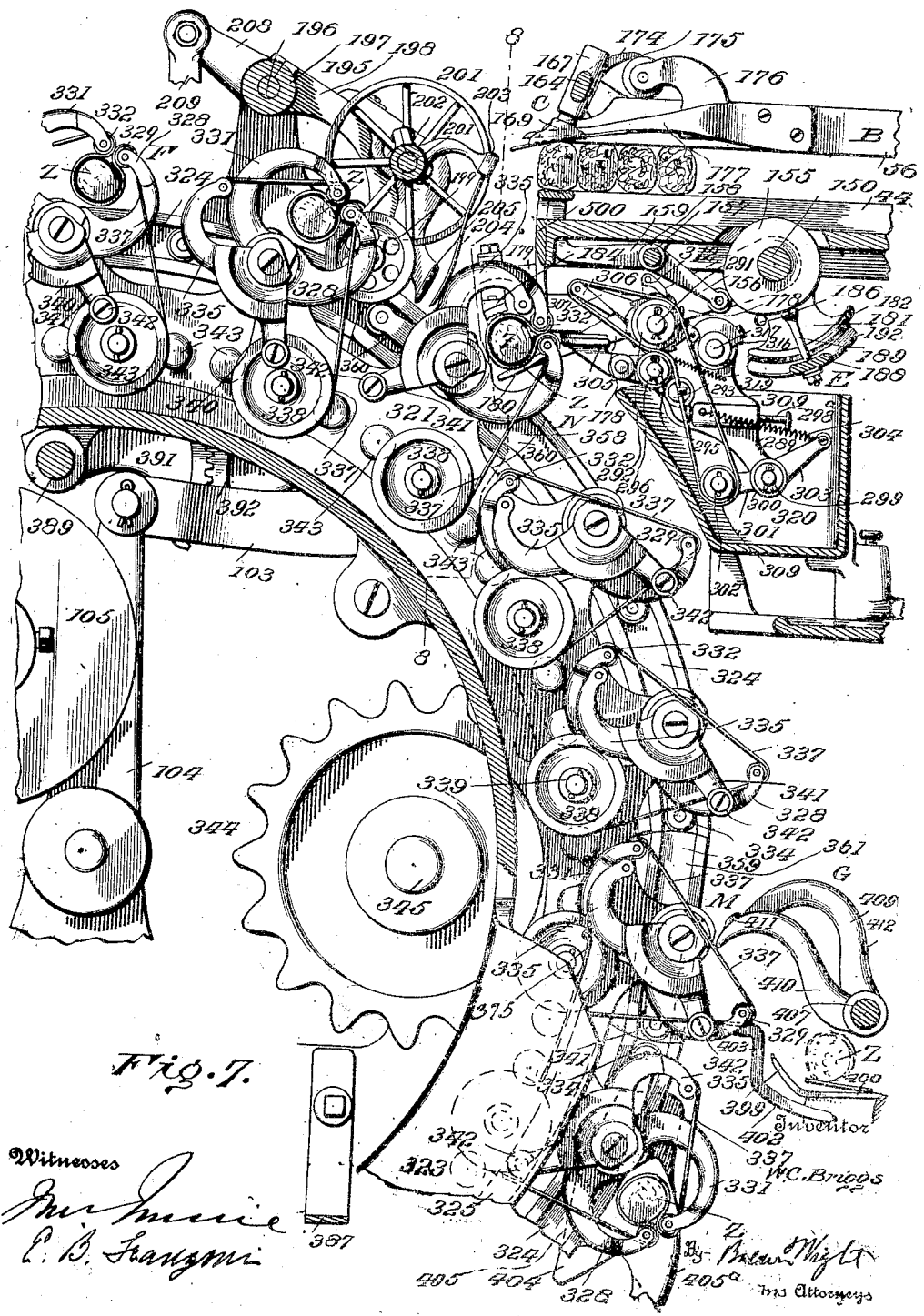
Figure 63:
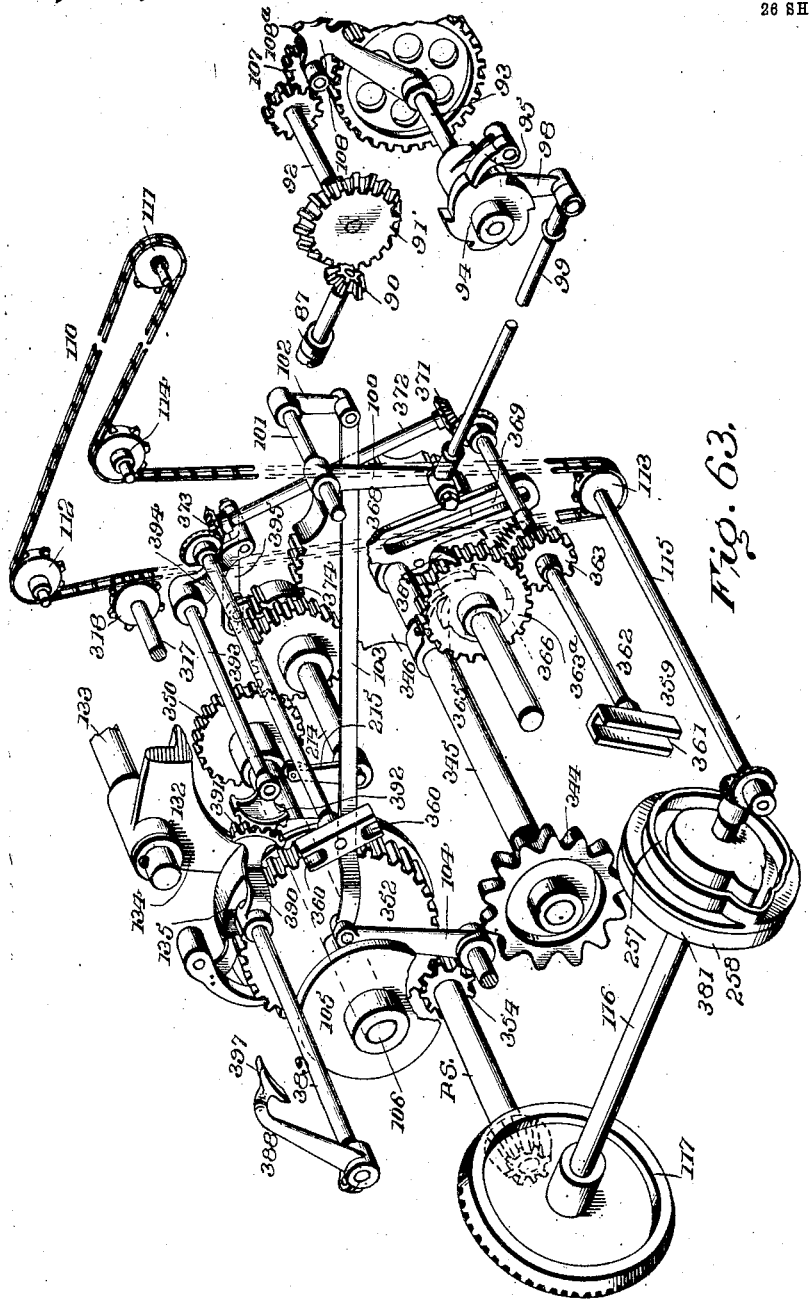

In the accompanying drawings, Figure 1 is a perspective view of the machine, a portion only at the front being broken away. Fig. 2 shows a side elevation of the machine with the front portion broken away. Fig. 3 is a view similar to Fig. 2 of the opposite side of the machine. Fig. 4 is a plan view of the rear portion of the machine. Fig. 4ª is a plan view of the front portion thereof. Fig. 5 is a rear view of the machine with parts in section and with portions broken away. Fig. 6 is a detail view in section on the line 6—6 of Fig. 2. Fig. 7 is an enlarged sectional view of portions of the cigar feeding mechanism and the band-applying mechanism. Fig. 8 shows a transverse section of the machine on the line 8—8 of Fig. 7. Figs. 8ª and 8ᵇ are detail views of parts of the mechanism for operating the cigar feeders. Fig. 9 is a detail view in section and on an enlarged scale showing the manner in which cigars are fed to the band-applying devices and how the band-applying devices operate. Figs. 10, 10ª and 11 are perspective views of portions of the band-applying devices. Fig. 12 is a view in longitudinal central section of one of the band-applying devices. Fig. 13 illustrates the condition of a band after it has been folded around a cigar by one of the band-wrapping tapes. Fig. 14 shows the condition of the band when completely wrapped on a cigar. Fig. 15 is a perspective view showing particularly parts of the mechanism for carrying cigars from the feeders to the band-applying devices. Fig. 16 is a perspective view of parts of the cigar carrying mechanism and the clamp mechanism coöperating therewith. Fig. 17 is a perspective view of the lower clamp. Fig. 18 is a detail view in perspective of a cam forming part of the abutment mechanism. Fig. 19 is a detail view of one of the upper clamps. Fig. 20 is a detail view in perspective of a portion of the mechanism employed for operating the cigar-carrying mechanism, the clamps and the band-applying mechanism. Fig. 21 is a detail view in perspective of part of the mechanism for starting the feeders on their return movement. Figs. 22 and 23 are perspective views of blocks employed in the band-applying mechanism. Figs. 24 to 31 inclusive are views of the transfer mechanism or cigar holder which receives cigars from a box and holds them in position to be transferred row by row to a platform over which they are moved to the feeders. Fig. 24 is a perspective view of the upper portion of the holder. Fig. 25 shows a horizontal section on the line 25—25 of Fig. 30. Fig. 26 is a detail view on an enlarged scale and in section on the line 26—26 of Fig. 29. Fig. 27 is a detail view of the ratchet mechanism for raising and lowering the cigar holder, parts being broken away to better illustrate the interior parts. Fig. 28 shows a front elevation of the holder, parts being broken away in order to better illustrate other parts. Fig. 29 is a plan view of the same. Fig. 30 shows a vertical section on the line 30—30 of Fig. 28. Fig. 31 shows a horizontal section on the line 31—31 of Fig. 28. Figs. 32 to 38 inclusive show details of the cigar feed mechanism. Fig. 32 is a transverse section on the line 32—32 of Fig. 4ª showing parts of this mechanism. Fig. 33 is a detail view in transverse section on the line 33—33 of Fig. 4. Fig. 34 is a perspective view of the supports of the guide bars for the ends of the cigar. Fig. 35 shows a transverse section on the line 35—35 of Fig. 38. Fig. 36 is a detail perspective view of one of the feeders. Fig. 37 is a detail view in perspective of one of the threaded nuts forming part of a feeder. Fig. 38 shows a horizontal section of one of the feeders on the line 38—38 of Fig. 35. Fig. 39 is a detail view in perspective of the devices for stripping banded cigars from the band-applying mechanism. Fig. 40 is a detail view in end elevation of the cigar feed mechanism showing particularly the devices for moving the feeders into place to be returned to their starting position. Fig. 41 is a detail view of a latch forming part of this mechanism. Figs. 42 to 50 inclusive are views of the band-feed mechanism. Fig. 42 is a detail view in perspective of parts of this mechanism. Fig. 43 shows a transverse section of the same with parts broken away. Fig. 44 is a detail view in perspective of the band hopper. Fig. 45 is a detail plan view showing particularly the band withdrawing device and its mountings. Fig. 46 is a detail view in transverse section on the line 46—46 of Fig. 45. Figs. 47 and 48 show parts of the guides in which the band-grippers move. Figs. 49 and 50 are perspective views of the upper and lower grippers forming parts of the band-feed mechanism. Fig. 51 is a detail view in perspective showing parts of the band-applying mechanism and certain devices which coöperate with the band-feed mechanism for temporarily holding a band in place. Fig. 52 is a detail view in section on the line 52—52 of Fig. 51. Fig. 53 is a detail view of a cam employed for operating the band withdrawing device, the brakes for the band-applying devices and the temporary band holder. Fig. 54 is a view of the opposite side of the cam, showing a cam groove for operating the band-feed grippers. Figs. 55 to 58 inclusive are views of the band moistening devices. Fig. 55ª shows a perspective view of the several parts of the moistener separated. Fig. 55 is a perspective view thereof. Fig. 56 is a similar view of the opposite side of the device. Fig. 57 is a detail sectional view approximately on the line 57—57 of Fig. 55. Fig. 58 is a plan view of the moistener. Figs. 59 to 62 inclusive are diagrams illustrating the manner in which cigars are carried to the wrapping devices and how the bands are applied thereto, the different steps being successively illustrated. Fig. 59 illustrates the position of the cigar carrier and the cigar clamping mechanism when the front cigar in a row has been forced by the feeders against an abutment, the band-applying mechanism having received a band and holding it in position to receive a cigar. Fig. 60 is a view similar to Fig. 59 but showing the front cigar in the row held in the carrier and ready to be carried to the band-applying devices, while the next cigar in the series is clamped and prevented from being moved out of place. Fig. 61 illustrates the next step in which a cigar has been carried to the band-applying devices and a band is partially wrapped around the cigar. Fig. 62 shows other steps, the lower part of this figure showing where the upper member of the carrier has been withdrawn from the cigar and the tape has been positioned properly to effect the rolling of the band and cigar in a subsequent operation; the upper part of Fig. 62 showing how a cigar has had a band completely wrapped around it. Fig. 63 is a diagram in perspective showing various gearings, connections, etc., from the power shaft to various parts of the mechanism. the arrangement of the shaft, gears. etc., being somewhat distorted from their real arrangement in order to better illustrate the connections.

The machine embodies means A for receiving cigars from a box for delivery to a platform; means B for feeding rows of cigars toward the cigar carrier; means C for carrying cigars individually to the band-applying mechanism; means D for feeding bands to the cigars, (all indicated in Fig. 1); means E for moistening the paste-carrying ends of the bands (Fig. 7); means F (Fig. 1) for applying the bands to the cigars; and means G (Fig. 7) for stripping the banded cigars from the band-applying mechanism.

All the cigars in a box are first delivered to the receiver or holder A from which they are moved in rows by hand over the table to the feeders B which carry them to the carrier C which conveys them to the band-applying mechanism F to which bands are fed by a band-feeder D, which bands are moistened at E and the banded cigars are finally ejected at G.

I will first describe the construction and operation of the mechanism A for receiving the cigars from boxes and holding them while the rows are successively passed on to the feeding mechanism. As before stated, the cigars are first carefully packed in boxes and then pressed and it is important that they should be so handled by the operator and by the machine that they may be returned to the boxes in precisely the same way. I so arrange the receiver or holder A that it may take all the cigars from a box and permit the several rows to be fed over the table to the feeders successively without disarrangement. The main frame X of the machine is constructed in any suitable way to support the various mechanisms. At one end of the machine (the front end), below the platform 1 is a shelf 2 formed with an opening 3 carrying devices for supporting and operating the holder 4 for the cigars. A carriage 5 is so mounted under the shelf 2 that it may be moved longitudinally of the machine and also transversely relatively thereto. This carriage comprises a frame 6 guided on one side by a bar 7 and on the opposite side by a slide 8 operating in a groove in the main frame. This frame 6 may be moved back and forth to a limited extent longitudinally of the machine and it carries a guide bar 9 and a guide 10 for a carriage member 11 which is so connected with the bar 9 and guide 10 that it may move to a limited extent transversely of the machine. In this way the cigar holder may be moved both longitudinally of and transversely to the longitudinal axis of the machine. The carriage member 11 is formed with a downwardly extending hollow arm 12 through which passes a vertical rack bar 13 on the top of which the cigar holder is mounted. The rack bar is engaged by a pinion 14 on a shaft 15 passing through a bearing 15$^a$ secured to the arm 12 and carrying on its outer end a ratchet wheel 16 which is hollow and contains a spring 17, one end of which is secured to the shaft 15 and the other to the wheel 16 so that it operates to turn the ratchet wheel and the pinion to elevate the rack bar and the cigar holder carried thereby. A detent pawl 18 engages the ratchet wheel and prevents it from turning, but the pawl is connected with a lever 19 engaged by a push rod 20 by means of which the pawl may be disengaged from the ratchet wheel and permit the rack bar to be raised by the spring 17, the latter being wound up by a downward movement of the holder. The pawl 18 is normally held in engagement with the ratchet wheel by a spring 18$^a$.

On the top of the rack bar is mounted the cigar holder 4. This comprises a base plate 21 formed with longitudinal flanges 22 and intermediate guide lugs 23. The base plate is provided with a centrally arranged opening 24 to receive the reduced cylindrical upper end of the rack bar 13 on the upper end of which is loosely mounted a pinion 25. The base 21 is free to rotate on the rack bar and it is provided on opposite sides of its pivotal connection with two recesses 26 to receive the upper end of a vertical locking rod 27 which operates through a casting 28 secured to the rack bar just below the base plate. The rod is normally pressed upward to enter one of the recesses 26 by a spring 29 arranged in a chamber in the casting 28 and the lower portion of the rod extends through an opening in a lug 12$^a$ extending from the arm 12. The lower end of the rod 27 carries adjusting nuts 30, which, when the holder is raised to its full extent, engage the lug 12$^a$ and effect the withdrawal of the upper end of the rod from the recess 26 with which it is engaged. This permits of the holder being turned about its pivotal connection with the rack bar in order that the rows of cigars may have their ends properly presented. On the base plate 21 are mounted two extensions 31 designed to increase the width of the holder.

These extensions lie close to the flanges 22 and are guided thereby. They are also guided by the pins 23 which extend through slots 32 in the extensions 31. Teeth 33 on the extensions engage the pinion 25 so that when one extension is moved the other will be correspondingly moved and thus the base plate will be extended equally at opposite ends. The extensions 31 carry top plates 34 and a top plate 35 is secured to the base plate 21 and overlaps the plates 34. These plates 34 and 35 are very thin and present a sufficiently smooth surface to receive the cigars either when the extensions are pushed in or drawn out. Each extension 31 carries at its end a wing or end piece 36 which is pivotally connected therewith, as clearly shown, and rises vertically therefrom. Each wing is bifurcated and holds a wire frame 37 which may be adjusted vertically to accommodate any desired number of rows of cigars. Each wing is held in an elevated position by a spring catch 38 engaging it.

In order to lock the extensions 31 in their adjusted positions, I employ the locking device shown in Fig. 26. This consists of a rod 39 having a tooth 40 entering a longitudinal groove 41, in one of the extensions. The rod extends down through one of the flanges 22 and carries a locking nut 42. By loosening the nut the extension may be adjusted but when the nut is tightened further movement of the extension is prevented.

The platform 1 is formed with a depression 1$^a$ at which is arranged the head of the push rod 20. This depression is adapted to receive the adjacent wing 36 of the holder when the latter is turned down and the holder is on a level with the table.

When cigars are packed in a box some rows have their butt ends arranged one way, while others are arranged with their butt ends at the opposite side of the box and for this reason the holder is made revoluble in the manner before described so that all the cigars in the several rows may be presented in the same way to the feeders B. The holder 4 is first made to assume a position in the same plane with the platform. This may be done by pressing the holder down or operating the push rod, then the wing of the holder adjacent the depression 1$^a$ is lowered and the holder is moved longitudinally to the required extent until its top surface is in the same plane as the top of the platform, then the operator empties a box of cigars on the platform adjacent the holder and moves them bodily without disarrangement over upon the holder. The adjacent wing 36 is then raised and the holder is moved slightly to the left and is then pressed down until the top row of cigars is on a level with the top of the platform, and then the holder is moved transversely of the machine until it is close to the front edge of the platform. The top row of cigars is then pushed by the operator off from the holder and across the platform to the feeders B. In like manner the holder after being turned around is operated and adjusted to present the successive rows of cigars in proper position to be moved over the platform to the feeders. The holder is so constructed that its wings may be adjusted to accommodate rows of cigars of different widths and they may also be adjusted to accommodate any desired number of rows of cigars. It may be easily reversed when necessary and by pressing one hand on the holder and operating the push rod with the other hand, the holder may be moved up and down as occasion may require. The holder therefore performs the function of receiving all the cigars from a box without disturbing their relation with each other or revolving them and presenting them to a platform over which they may be evenly passed row by row to the feeding mechanism which will next be described.

The function of the cigar-feeding mechanism is to take the rows of cigars as they come from the holder A and automatically feed them regularly and evenly without revolving them to the carrying or delivering mechanism C which transfers them one by one to the band-applying mechanism F.

The platform 1 is formed on its upper side with a depressed portion in which are arranged two parallel rails 44 which extend from the front portion of the platform to the rear end thereof. These are arranged to form under supports for the opposite ends of the cigars and over these rails the cigars are moved without being rotated or otherwise disturbed in the manner hereinafter described. Parallel with the rails 44 are side guide bars 45 which are adapted to engage the opposite ends of the cigars and are adjustable toward and from each other to accommodate cigars of different lengths. Each of these bars is secured to two flanged brackets 46 having studs 47 connected with a longitudinally arranged bar 48 and extending through transverse slots 49 (Fig. 1) in the platform. Projecting from each bar 48 is an arm 50 to which is attached a rack bar 51 operating in guides 51ª on the under side of the platform and engaging a pinion 52 carried by a threaded rod 53 having a hand wheel 54 and a lock nut 55. By releasing the nuts and turning the hand wheels the desired adjustment may be given to the side gages. Upper guide bars 56 disposed parallel with the rails 44 are provided to prevent the cigars from rising out of place from the rails, and as cigars vary in diameter these upper guides are made vertically adjustable. For this purpose each upper guide bar is attached to a longitudinally arranged reinforcing member 57 having a dovetailed flange 58 (Fig. 4) one of which fits a dovetailed groove in a bracket 59 secured to the top of the platform, while the other dovetailed flange fits in a corresponding groove in the frame of the feeders. In the wall of each dovetailed groove is a semi-circular plane groove 60 which registers with a threaded semi-circular groove 61 in the flange 58 to form an opening to receive a threaded bolt 62 having a shoulder 63 engaging a projection 64 formed on the bracket 59. The upper end of the bolt has a square projection 65 to receive a tool for operating the bolt to raise and lower the guide bar. By these devices the upper guide bars may be raised, lowered and adjusted to the desired extent to accommodate cigars of different diameters and to properly hold them on the rails 44 and yet permit them to be moved toward the carriers without being rotated or in any way injured.

In order to move the rows of cigars from the front end of the table to the carrier C, I employ the feeders H which are mounted, constructed and operated as will be next described.

66 indicates a supporting and guiding frame for the feeders while they are being moved toward the carriers and 67 indicates an inclined supporting and guiding frame for the feeders while they are being returned to starting position. The frames extend from the front portion of the platform up to the carriers and are rigidly held in place.

68 and 69 are rigidly supported guide rods which assist in supporting and guiding the feeders.

70 in Fig. 32, indicates a bracket for supporting the front ends of the rods 68 and 69.

I employ a plurality of feeders all of the same construction and adapted to be interposed between rows of cigars and move them forward. Each feeder comprises a block 71 having a portion 72 which rests and slides on a flange 73 of the frame 66 and to its opposite ends are secured plate brackets 74 having recesses 74ª and 74ᵇ which are adapted to engage the guide rods. The block 71 is formed with a horizontally arranged dovetailed groove 75 into which enters a bracket 76 carrying the downwardly extending feed plate 77. The plate 77 is secured at the front end of the bracket and it is bifurcated and enters below the plane of the upper edge of the guides 45 and engages the cigars between the rails 44. The bracket 76 is adjustably connected with the block 71 in order that the feed plate may be properly adjusted to feed the cigars accurately. For this purpose the block 71 is formed at its front end with a threaded socket 78 which receives a screw 79 mounted in the front end of the bracket 76. By adjusting this screw the feed plate may be given a delicate adjustment toward and from the cigar carrier C, to accommodate cigars of different sizes. The block 71 is formed with a vertical opening 80 which receives a vertically movable nut 81 having a longitudinal groove 82 within which is a sliding block 83 engaged by the crank arm of a rod 84 extending through the bracket 76 and provided with an operating arm 85. This arm is operated in the manner hereinafter described to automatically raise the nut above the lower part of the block so that when the feeder is first turned over into operative position it will not engage its operating screw shaft. The nut 81 is formed on its under side with a segmental series of screw-threads 86 which engage an operating screw-shaft 87 arranged and operated in the manner presently described. On the front end of each feeder is a horizontally arranged rod 88 which is adapted to abut against the rear end of the next succeeding feeder in the series to maintain it a proper distance away, so that each feeder operates on one row of cigars and pushes rearward those cigars immediately in advance of it or between it and the next adjacent feeder. This rod may be adjusted by a set screw 89 to accommodate rows of cigars of different lengths. By rows of cigars it will be understood that I mean a row containing twelve or thirteen cigars or a row of the same number of cigars as taken from a box.

The screw-shaft 87 is mounted longitudinally in the frame 66 and engages the nuts 81 of all the feeders when they are operating upon the rows of cigars. It extends from front to rear of the feeder frame and is operated to move the feeders at the proper speed and at proper intervals. On one end of the screw-shaft is a pinion 90 (Fig. 63) meshing with a pinion 91 on a shaft 92 geared as shown with a shaft 93 mounted under the platform 1 and carrying a ratchet wheel 94 engaged by a pawl 95 pivoted to a swinging frame 96 loosely mounted on the shaft 93 provided with a depending arm 98 jointed to a connecting rod 99 pivoted at its opposite end to an arm 100 on a rock shaft 101 provided with an arm 102 connected by a rod 103 with an arm 104 oscillated by a cam 105 on a shaft 106 geared to the power shaft P. S. This cam is so formed that it will, through the connections just described operate the screw-shaft to actuate the feeders to move the cigars forward step by step to the carriers which take them singly or individually to the wrapping devices.

In order to vary the movement of the screw-shaft to accommodate cigars of different diameters, the pinion 107 forming part of the gearing connecting the shaft 92 with the shaft 93 is carried by a swinging frame 108 operated by a handle 108ᵃ so that a pinion of one size suitable for cigars of one diameter may be changed for a pinion of different size corresponding with cigars of a different diameter. After a pinion has been properly placed, the frame may be locked by the devices shown at 109 (Fig. 3).

The screw-shaft 87 serves to move the feeders toward the carriers. Other mechanism is provided for returning the feeders to the front end of the feeder frame. This operation is effected by an endless sprocket chain 110 (see Fig. 63). This chain extends over a sprocket wheel 111 mounted at the front end of the feeder frame and over a sprocket wheel 112 at the rear end thereof. From the wheel 112 the chain extends downward under a sprocket wheel 113, then upward over a sprocket wheel 114 and thence to the wheel 111. The wheel 113 is attached to a shaft 115 geared with a shaft 116 carrying a beveled gear 117 geared with the power shaft PS. In this way the chain is moved continuously. The feeders when moving toward the carriers are guided by the flange 72 and the rod 68 (Fig. 32) but when returning they are thrown up onto the inclined guide frame 67 and are guided by this frame and by the rod 69, as shown by dotted lines in Fig. 32. As soon as a feeder reaches the rear end of the table it is automatically turned over onto the inclined guide frame 67 and engaged by the chain 110. This is effected by the devices mainly shown in Figs. 8 and 32, see also Figs. 20, 21, 40 and 41.

Pivotally connected with the rear end of the frame 66 is a horizontally arranged lever 118 provided with a forwardly projecting pin 119 and extending from the hub of said lever is an arm 120 jointed to a downwardly extending rod 121, the lower end of which is beveled and formed with a shoe 122. Intermediate the upper and lower ends of the rod 121 is a shoulder 123. This rod is operated by a slide 124 having a lower arm 125 and an upper one 126. The slide reciprocates vertically in a guide-way 127. The upper end of the slide is provided with a slot 128 (Fig. 21) in which fits a block 129 on a rod 130 which is attached to a rocking lever 132 (Fig. 20) mounted on a stub shaft 133. A downwardly projecting arm 134 of the lever 132 engages a cam 135 (Fig. 3) on the shaft 106. By this mechanism the slide 124 is moved up and down at the proper times. On the pin 137 which joins the rod 121 to the arm 120 is a spring 138 one end of which as shown in Fig. 8ᵇ, is secured to said pin and the other end of which fits under the arm 120 and tends to move the rod 121 toward the slide 124. A latch 139 (Fig. 41) is mounted at the front end of the feeder frame 66 and carries a finger 140 extending into the path of the feeders. The latch also has a laterally projecting arm 141 having a toothed end 142 adapted to engage the shoulder 123 on the rod 121. A spring 142ᵃ operates to hold the toothed end of the arm 141 in position to engage the shoulder 123. When a feeder has reached the limit of its movement toward the carriers, its bracket 74 engages the finger 140 and this releases the tooth 142 from the shoulder 123. This allows the spring 138 to swing the lower end of the rod 121 laterally to bring the shoe 122 into the path of the arm 126 on the slide 124 which is then elevated. As the slide moves downward the arm 126 engages the shoe 122 and pulls the rod 121 downward and rocks the lever 118 upwardly and as the pin 119 is at this time beneath a portion of the bracket 74 of the adjacent feeder, the feeder will be turned upwardly about the rod 68, and then the recesses 74ª of the bracket will engage the rod 69 and the latter becomes a support for the feeder and the feeder is further turned about this rod until it assumes the position shown by dotted lines in Fig. 32 and by full lines in Fig. 40. The blow given to the feeder by the pin 119 is sufficient to throw it over onto the inclined guide-way 67 and in so doing the feeder strikes against a spring finger 143 which extends through an opening 144, as shown in Figs. 1, 3, 4 and 32, and this spring acts as a cushion to receive the blow. An opening 144 in the guide-way 67 is so shaped and disposed that when the feeder is thrown over, in the manner before described, the operating arm 85 of the shaft 84 will fall by gravity and hang down in the opening, as shown in Fig. 40, and at the same time the screw 89 on the feeder is caught by the continuously moving sprocket chain 110. Thereafter the feeder will be dragged along the guide-way to the front end feeder frame, as shown in Fig. 1, where it remains for future use. When the chain moves the feeder forward the operating arm 85 strikes against the front wall of the opening 144 and thus the rod 84 is turned effecting the withdrawal into the block 71 of the nut 81 so that the operator upon setting the feeder for a subsequent operation may move it freely along the screw-shaft 87 until it abuts against the rod 88 and the cigars and then by turning the operating arm 85 the nut may be made to engage the screw. When the arm 126 of the slide 124 pulls the rod 121 downward the latter remains in this position until the slide 124 rises, when the lower arm 125 will strike the lower beveled end of the rod and move it laterally and at the same time will push it upward and cause the lever 118 to return to its normal position when the tooth 142 of the latch 139 will again engage the shoulder 123 and hold the lever 118 in position for the next operation. The feed mechanism B thus serves to feed rows of cigars automatically to the carrier C intermittently and as soon as each feeder has performed this function it is automatically withdrawn from the line of feed and returned to the starting position for future use. The rows of cigars are pressed between the feed plates and are somewhat compressed. In this way rows of exactly the same length are insured.

Beneath the platform 1 is a rock shaft 150 carrying a segmental gear 151 meshing with a corresponding gear 152 on the lever 132 (Fig. 20). By the operation of the cam 135, before referred to, an intermittent oscillatory movement is given to the shaft 150. It will be observed by reference to Fig. 20 that the segmental gear 151 has a concave portion 153 coöperating with a convex portion 154 on the segment 152. When this convex portion 154 engages the concave 153 the shaft 150 will not be moved and this occurs when a band is being wrapped around a cigar as will be hereinafter described.

On the shaft 150 is a cam 155 operating a lever 156 (Fig. 17) secured to a shaft 157 mounted beneath the platform 1. The lever 156 is provided with a hub 158 from which extend three arms 159 and from one end of the shaft 157 extends another arm 160. The outer ends of the arms are bent upwardly and project through openings in the table and at their upper rear ends carry clamps 161, 162 which are corrugated or roughened, as shown, being adapted to engage the cigars just prior to their delivery to the band-applying mechanism. Two of the levers 159 form a support for the clamp member 161 for the middle portion of a cigar while the outer clamp members 162, 163 engage the cigar near its ends. When the cam 155 is operated it depresses the lever 156 and elevates the clamp members, causing them to engage a cigar and when the cam is removed from the lever the clamp members will drop and release the cigar.

A bar 164 extending across the delivery end of the platform is supported by two arms 165 loosely mounted on the shaft 150. This bar is pivotally mounted in the upper ends of the arms 165 and has a slight rocking movement therein. A spring 166 connected to the bar and to one of the arms 165 retains the bar 164 in its normal position i. e., with its lower edge held in rear of its upper edge. This bar 164 carries a number of sleeves 167 in which are mounted plungers 168, the lower ends of which are provided with clamping heads 169 which coöperate with the clamp members 161, 162, 163 in holding cigars at the delivery end of the platform. Each plunger 168 has a reduced stem and between a shoulder on the sleeve and a shoulder on the plunger is interposed a spring 170 to normally press the clamping device toward the cigar, said downward movement being limited by a pin 171. This construction tends to cause the clamps to accommodate themselves to any inequalities in the cigars and they are so constructed and operated as to avoid crushing the cigars. Depending from the hubs of the arms 165 are short arms 172 to which are attached springs 173 operating to normally draw the clamp members 169 downward. When the bar 164 is lowered it is rocked by an arm 174 carried by said bar and which engages a roller 175 mounted in a bracket 176 attached to the part 56 of the guides. The movement imparted to the upper clamps 169 is such as to tend to force the cigar which it engages toward the front end of the machine and insures of the face of the cigars being held approximately within the plane of the rear edge of the table.

177 indicates a leaf spring secured to a bracket on one of the guides 56. The free end of this spring projects beyond the plane of the upper clamps and serves to steady the cigars while being advanced toward the wrapping mechanism. This spring also serves to prevent the cigars from jumping out of position when the feeders move it from the platform. This is important inasmuch as there is a short interval when each cigar is not in the grasp of the clamps when the cigar is being moved off of the table.

The carrier for conveying cigars from the table to the wrapping devices comprises upper and lower clamping members constructed, arranged and operating as follows: Mounted on the shaft 150 are arms 178 and 179. The arms 178 carry the lower clamp members and the arms 179 carry the upper clamp members. The arms 178 are loosely mounted on the shaft 150 and are provided at their upper ends with clamping plates 180 having teeth 181. Depending from the hubs of the arms 178 are brackets 181 carrying segmental shoes 182 for a purpose presently explained. The arms 179 are fixed to the shaft 150 and to their upper end are adjustably secured lateral arms 183, the ends of which are enlarged to form the upper clamp members 184 which coöperate with the lower clamp members 180 to grasp a cigar and carry it to the band-applying mechanism. Fixed to the shaft 150 between the hubs of the arms 178 and 185 are hubs 185 from which extend inwardly projecting lugs 186 which fit between the arms 178 and the brackets 181 and serve as a means for raising said arms. The arms 165 are provided with outwardly projecting lugs 187 which are disposed in the paths of the arms 179 so that when the latter are elevated they will also elevate the arms 165 and thus raise the cross bar 164 thereby releasing the pressure of the upper clamp members 169 on the cigars. As previously stated the arms 172 are loosely mounted on the shaft 150 and in order to control their oscillating movement, I provide friction devices to coöperate with the segmental parts 182 of the bracket 181. These devices consist of a cross bar 188 secured to the under side of the platform by bolts 189. The bolts pass through openings in the cross bar and at their outer or lower ends are provided with nuts 190 between which and the cross bar are arranged plate springs 191. At the ends of the cross bar are segmental plates 192 provided with leather linings 193. The segments 182 contact with the leather, the degree of friction being regulated by the springs 191, the force of which is adjusted by the nuts 190. By this construction when the shaft 150 is oscillated the arms 179 are able to move up or down to a limited extent without moving the arms 178, the latter being held in place by the friction devices just described, but when in the upward movement of the arms 179, the lugs 186 come in contact with the arms 178 the latter are raised. The arms 178 are lowered when the clamp member 184 engages a cigar and the arms 179 are moved downward. The lugs 186 do not come in contact with the brackets 181.

It will be understood that the shaft 150 is oscillated by the mechanism before described, that it properly operates the clamps and the carrying devices to properly perform their functions, but as these devices coöperate with other mechanism and are actuated at certain times relatively to the movements of the other mechanism, a description of their operation will be reserved for the present.

Coöperating with the cigar carrying or delivering mechanism is the abutment mechanism 195. A hub or sleeve 197 is fixed to a shaft 196 and has forwardly projecting brackets 198 in the lower forward ends of which are mounted two freely revolving relatively small wheels 199. Above the wheels 199 and mounted in the brackets 198 is a shaft 200 on which freely revolve two wheels 201, disposed outside the plane of the wheels 199, and these wheels 201 are of considerably larger diameter than the wheels 199. Secured to the shaft 200 is a hub 202 from which extends forwardly two arms provided at their outer ends with heads 203 each of which is slit to receive the upper end of a spring 204 which depends downwardly to a point adjacent the clamps 180 when the latter are elevated. I may employ two springs 204 but one is sufficient. These springs are adjustably connected with the heads 203 as illustrated. The springs (or spring 204) bear against the first cigar in the series before the latter is received by the carrier members, i. e., while the members 180 are lowered and before the clamps 169 and 161 operate, and when the row of cigars is fed farther forward the springs are put under tension, as shown by full lines in Fig. 59, and at this time the members 180 of the carrier rise and support the cigar. Abutment plates 205 are provided which are formed with teeth 206 which intermesh with the teeth 181 on the clamps 180 when the latter are elevated in a position to receive a cigar from the table. The abutment plates are carried by bent metal strips 207 adjustably secured to the top portions of the brackets 198. The shaft 196 has rigidly secured to it an arm 208 which is pivotally connected at its outer end to the upper end of a lever 209, the lower end of which is enlarged and provided with two cam surfaces 210 at the ends of which are shoulders or abutments 211, 212. Extending across the enlarged portion of the lever 209 and outwardly therefrom is a slotted plate 213 through which extends a rod 214. The rod 214, shown in Fig. 18, carries a lever 215 provided with a roller 216 which travels on the cam surfaces 210 and coöperates with the shoulders 211, 212 to operate the shaft 196. When the roller 216 strikes the shoulder 211 it rocks the shaft 196 and lowers the abutment, and when said roller strikes the shoulder 212 the abutment is elevated. The manner in which the abutment coöperates with the cigar-carrying or delivering mechanism and the band wrapping mechanism will be hereinafter more fully explained.

Before describing the manner in which the cigars are carried and delivered to the band-applying mechanism, I will describe the construction and operation of the mechanism which takes the bands from a stack or pile and delivers them to the band-applying devices. The pile or stack of bands is arranged in a holder 217 (Fig. 44) supported on the guides 218 and 219 hereinafter referred to. The holder consists of a base frame 219$^a$ supported on the guides 218 and 219 and adjustably secured thereto by adjusting devices 220. (See Fig. 4). To the base frame 219$^a$ are secured uprights 221 properly spaced to receive the bands and adjustably connected with the base frame by suitable devices 222 so that bands of different sizes may be accommodated. As shown, there is an opening 223 in the base frame so that the bands may be conveniently manipulated when a pile is being inserted or withdrawn. The uprights 221 extend below the frame 219$^a$ and have serrated inner edges 221$^a$, as shown, for a purpose hereinafter described. The bands Y are piled or stacked in the holder as shown in Fig. 43 and rest on cross pieces 221$^b$. It will be observed that these supports 221$^b$ are located under the extreme opposite ends of the bands. As shown, one of the uprights is formed with a beveled groove or channel 221$^c$ to receive the ends of correspondingly shaped bands.

Below the band holder is a withdrawing device 250 which removes the lowermost band from the pile and delivers it to grippers which hold it and carry it to the band-applying devices. The guide 218 comprises two parallel bars 223$^a$ spaced apart by blocks 224 interposed between their opposite ends and forming a guide way for a block 225 which is reciprocated therein. This block carries only one of the band-gripping and carrying devices. The other guide 219 comprises a bar formed with a groove 226 to receive a slide 227 on the other member of the band-gripping devices. Above the bar 219 is a relatively shallow bar 228 which has lugs 229 at its ends which hold its middle portion slightly above the top of the bar 219 and the bar 228 is formed with a groove 230 to receive two flat springs 231 which bear on a tension plate 232 to cause a friction on the lower member 233 of the grippers and to thus cause said member to move steadily and to remain at rest while the other gripper member moves over it to a limited extent. Between the member 233 and the plate 232 is a leather strip 234 to assist in the operation above mentioned, and projecting from the plate 232 are ribs 236 which fit the groove 230 in the bar 228. The lower member 233 of the gripping mechanism which is secured to the slide 227 is guided on one side by a groove 237 formed in the reciprocating block 225. The upper member 238 is rigidly secured to the block 225 at one edge and its opposite edge moves in a guide-way 239 formed in a bar attached to the lower member 233 (Figs. 42 and 48). This upper member is formed with a slot 240 through which extends a pin 241 on the lower member to assist in guiding the plates relatively to each other and to limit their relative movement. The front end of the lower member 233 is reduced in width and terminates in two parallel gripping fingers 242 and in rear of the fingers are parallel slots 243. The upper member 238 is formed at its front end with lugs 244 in which is mounted a rod 245 carrying two forwardly projecting fingers 246 which coöperate with the fingers 242 to grip the bands. The inner ends of the fingers are bent downward at 247 and extend through the slots 243 of the lower member 233 and as the member 238 reciprocates the ends of the slots 243 strike the ends 247 of the fingers 246 and the latter are lowered at their outer ends. On the rod 245 is a block 248 which is engaged by a spring 249 secured to the upper member 238 and which normally holds the outer ends of the fingers 246 elevated away from the fingers 242 when the band delivering mechanism is being returned away from the band-applying mechanism.

It will be observed that the gripping members while at times moving together, also have a limited movement relatively to each other, i. e., when the upper member is first moved toward the band-applying mechanism it does so without moving the lower member, but as soon as the ends 247 of the fingers 246 are struck by the front walls of the slots the fingers are depressed at their outer ends and then the two members move together. On the retreat of the grippers the upper member first moves relatively to the lower member permitting the spring 249 to lift the fingers 246 and then as the upper member moves farther rearward the pin 241 comes in contact with the front wall of the slot 240 and after that as the upper member retreats it causes the lower member to retreat with it. The manner in which the bands are grasped and carried to the band-applying mechanism will be described later on.

The withdrawing device 250 operates beneath the band holder and draws the lowermost band from the pile and delivers it to the grippers. Guides 251 are attached to the frame between the guides 218 and 219 and they receive a slide 252 which reciprocates vertically in them. The slide is operated by a lever 253 provided with a roller 254. The roller 254 engages a cam 257 formed on the cam disk 258 on the shaft 116. By this mechanism the slide is raised and lowered at the proper times. The slide carries a valve casing 259 the upper part of which connects with a perforated cap 260 and the lower part connects with a passage 261 communicating with a flexible tube 262 connected with a vacuum pump (not shown). A valve 263 is arranged to oscillate in the valve chamber and is carried by the flattened end 264 of the valve stem 265. The valve is bifurcated as shown and between the inner end of the recess of the bifurcation and the adjacent flattened end 264 of the valve stem is interposed a spring 264ª which presses the valve radially outward and causes its face 263ª to move in yielding contact with the walls of the valve chamber. When the face of the valve is moved away from the mouth of the passage 261 communication is established between said passage and the perforated cap 260. The valve stem 265 projects through a stuffing box 266 and carrying a toothed segment 267 meshing with a similar segment 268 mounted on the slide 252 and carrying a roller 269 which is adapted when the slide is lowered to strike an adjustable post 270 mounted on the frame. When the roller strikes the post the valve is closed. On its upward movement the roller strikes a plate 271 and thus opens the valve. The plate moves in a guide-way 272 and is provided with a pin 273 engaging a lever 274 whereby the plate may be withdrawn from the path of the roller and thus the valve will not be opened and bands will not be withdrawn as the device reciprocates. In the normal operation of the machine the bands are withdrawn one at a time from the pile, delivered to the grippers and carried to the wrapping devices in proper sequence.

In order to temporarily hold the bands on the band-applying devices I employ the devices most clearly indicated in Fig. 51. This consists of a spring finger 275 carried by a hub 276 on a shaft 277 mounted in bearings 278. The shaft carries a spur wheel 279 meshing with a rack bar 280 connected with the upper end of the bell crank lever 281 pivoted to a bracket 282 of the frame and held by spring 284 in the path of a cam 283 on the cam disk 258. This device operates in the manner hereinafter described. The block 225 to which the upper member of the grippers is connected is secured to a block 225ª connected with a lever 285 having an arm 286 operated by a cam groove 288 in the cam disk 258. By this mechanism the band-gripping and feeding devices are reciprocated at the proper times to deliver the bands one at a time to the wrapping devices.

The withdrawing device is elevated when the grippers are at the end of their retreat from the band-applying devices. The withdrawing device moves up under the pile of bands and raises them bodily in the holder. As the withdrawing device rises its valve is opened and the lowermost band in the pile is caused to adhere to the cap 260. As the withdrawing device lowers the pile of bands descend with it and in case more than one band follows the withdrawing device the downward movement of such extra bands is arrested by the teeth 221ª which creates such friction or obstruction that only one band will adhere to the withdrawing device. Such bands as are thus caught by the teeth 221ª are raised on the next upward movement of the withdrawing device. As soon as the withdrawing device has been sufficiently lowered the suction is cut off in the manner before described and the delivered band rests on the fingers 242 of the lower gripper member, then the upper gripper member moves forward, the fingers 246 being closed down upon the band held by the fingers 242 and the band is thus securely held and then the grippers move forward together and carry the band to the band-applying mechanism and deposit it thereon. The temporary band holder 275 is operated at the proper time to engage the band delivered by the grippers and hold it until a cigar is deposited on it, the band being at the same time held by the moistening devices E.

Each of the bands in the stack carries adhesive material on one end and just after the band is delivered to the band-applying devices this adhesive is moistened by the moistening devices shown most clearly in Figs. 55 to 58 inclusive.

The moistener is located beneath the rear end of the platform 1, as shown in Fig. 7, and is constructed and operated as follows: A frame 289 is attached to a part 290 of the main frame and is provided with a laterally projecting stub shaft 291 carrying a roller 292 and a rod 293 carrying a lever 294 to which is attached a laterally projecting stub shaft 295 carrying a roller 296. The lever 294 has a downwardly projecting arm 297 against which presses a spring 298 mounted within a housing and adjustable by means of a screw 298ª. This spring serves to press the roller 296 toward the roller 292. The lower part of the frame 289 carries a stub shaft 299 on which is a hub 300 having an arm 301 carrying a roller 302, and another arm 303 on the hub 300 is connected with a spring 304. The frame 289 also has a laterally projecting plate 305 which carries a pad 305ª. The plate 305 projects from a sleeve 305ᵇ mounted on a rod 305ᶜ secured to the frame 289. The plate 305 is stationary but over this plate is another plate 306 which is carried by an arm 307 projecting from a sleeve 313 mounted to turn on the shaft 291. The plate 306 carries a roller 308 at its outer edge and an endless tape 309 extends over the rollers 292, 296, 302 and 308 and passes between the upper and lower plates 305, 306. As will be presently explained motion is imparted to the roller 292 and the tape is caused to turn the rollers 296, 302 and 308. In order to hold the tape in position I provide a guide 310 attached to the rod 293. The spring 298 presses the roller 296 against the roller 292 and produces the necessary gripping action to insure a proper feed of the tape, while the spring 304 holds the tape taut. The roller 292 is provided with a ratchet wheel 311 engaged by a pawl 312 mounted on an arm 312ª extending from the sleeve 313, which sleeve is also provided with an arm 314 carrying a roller 315 arranged in the path of a cam 316 secured to a shaft 317 carrying a sprocket wheel 318 engaging the chain 110 which operates the cigar feeders. The sleeve 313 is maintained in its normal position by a spring 319 secured to the sleeve and to the frame 289, the tension of the spring being such as to cause the plate 306 to be moved toward the pad-carrying plate 305. The lower part of the moistener extends into a tank 320 supported on the frame beneath the rear end of the table 1. The tank contains water which moistens the tape as the latter passes through it. The moistening devices are so operated that a band is received by them when they are in an open condition as shown in Fig. 7, then the plates 305, 306 are closed upon, grip the band and moisten its paste-carrying end, then the devices are operated to release the band and allowed it to be wrapped around a cigar.

Having described how cigars and bands are fed to the wrapping devices and how the paste-carrying ends of the bands are moistened, I will now describe the construction and operation of the devices which receive the cigars and bands and apply the latter to the former.

The band-applying devices are carried by an annular carrier 321 arranged between an annular flange 322 of the frame and a ring 323 attached to the frame. The flange 322 is provided with a circular groove 324 and the ring 323 is provided with a circular groove 325 for a purpose hereinafter described. To the carrier ring is attached a series of radially disposed brackets 326 which support the devices for applying the bands to cigars. These devices are all of precisely the same construction. Each bracket 326 carries a hollow shaft 327 provided at one end with a curved arm 328 carrying a roller 329. Within the hollow shaft is a rod 330 to one end of which is secured a curved arm 331 carrying a roller 332 which alines with the roller 329 on the hollow shaft 327. On the opposite end of the rod 330 is an arm 333 carrying a roller 334 which operates in the annular groove 324 formed in the flange 322 of the frame. Pivotally mounted on the end of the rod 330 is a curved arm 335 fitting close to and conforming approximately to the curvature of the arm 331 and at its free end is provided with a pin 336 to which is secured one end of a tape 337 which passes from the pin 336 over the rollers 329 and 332 and thence to a spring drum 338 mounted on a pin 339 extending from the bracket 326. The arm 335 extends from one end of a segmental hub 340 from which extends another arm 341 carrying a roller 342 operating in the groove 325 in the ring 323. The rollers 334 and 342 are guided in the grooves 324 and 325 and the forms of these grooves are such as to hold the arms 333 and 341 properly, but the grooves are also so formed as to allow these arms to move out of their normal positions at certain times, i. e., when cigars and bands are being received and while the bands are being wrapped around the cigars, and also when the banded cigars are being discharged or ejected from the band-applying devices. The groove 325 does not extend entirely around the ring 323, but the ring is interrupted as shown in Fig. 7 so that at times the roller 342 leaves the groove 325 and the arms 341 are free to turn as when the bands are being applied to the cigars and when the banded cigars are being ejected. The groove 324 while mainly continuous has at two points interruptions occupied by certain devices which will be described later on.

The pins 339 which attach the spring drums to the carrier and other pins 343 attached to the carrier-ring between the pins 339 form a circular series of teeth with which engages a toothed wheel 344 attached to a shaft 345 on the end of which is a large mutilated gear wheel 346 meshing with a mutilated pinion 347 on the shaft 214 which carries a spur-wheel 349 meshing with a gear 350 on the shaft 106 which carries a spur-wheel 352 meshing with a pinion 354 on the power shaft PS. By this mechanism an intermittent rotary motion is given to the carrier, i. e., it is moved about its axis progressively step by step stopping at intervals to permit the band-applying mechanism to operate and the band-ejecting mechanism to be actuated. The power shaft carries fast and loose pulleys 355, 356 provided with belt shifting devices 357 of well known construction. The grooves 324 and 325, as before stated, are not continuous. The ring 323 is cut away in the manner indicated in Fig. 7 from a point just below where the cigars are ejected to a point just above where the bands are applied so that the roller 342 is for a time removed from the groove 325. In like manner the groove 324, while for the most part continuous and formed in the flange 322 of the main frame, is cut away at the parts marked M and N, and in these parts are mounted the blocks 358 and 359. The block 359, which is shown in Fig. 23, is formed with a continuous groove 361, adapted to register with the groove 324, while the block 358, shown in Fig. 22, has grooves or recesses 360 at opposite ends also adapted to register with the groove 324. The block 358 assists in the applying of bands to the cigars while the block 359 assists in ejecting the banded cigars. The block 359, which operates when a cigar is being ejected, is carried by a shaft 362 having a pinion 363 engaging a spur wheel 363ª on a shaft 364. A spring pawl 365 secured to the shaft 345 engages a ratchet wheel 366 secured to the spur wheel 363ª and prevents it from moving backward. The spur wheel is operated periodically by a pawl 367 carried by a lever 368 connected with the rod 130 hereinbefore mentioned. The lower end of the lever 368 is slotted at 369 and is guided by an adjustable guiding device 370. As the lever 132 is operated the wheel 363ª is actuated to turn the block 359 to the proper extent. The shaft 362 is connected by beveled pinions 371 to a shaft 372 which is in turn connected by beveled pinions 373 with a shaft 374 on the end of which is mounted the other block 358. In this way the blocks 358 and 359 are simultaneously operated, the one to assist in ejecting banded cigars and the other to assist in applying bands to the cigars.

Referring to Fig. 7, when a set of band-applying devices approaches the block 359 they are in the condition shown at the lower end of this figure, the roller 342 being in the groove 325 and the roller 334 in the groove 324. As this set of band applying devices moves farther upward the roller 342 leaves the groove 325 and the roller 334 enters the groove 361 of the block 359, then the block is given a half turn and the roller is carried around to the groove 324 again but in so doing it moves the roller 332 away from the roller 329 and opens the pocket and ejects the banded cigar; then this set of band-applying devices moves on in their open condition, the roller 334 being in the groove 324. At the same time the arm 341 swings out, as indicated, its roller being released from the groove 325. Just after leaving the groove 325 the roller bears upon the spring 375 which forms a continuation of the groove 325 and prevents the arm 335 from being swung out by the tension of the spring drum until the pocket-forming arm has been properly moved to open the pocket.

The stripping devices G which assist in ejecting the cigar will be described later on. At the same time that the block 359 is turned, the block 358 is also turned. When the roller 334 after traveling in the groove 324 enters the lower groove in the block 358, the latter turns in such manner as to cause the arm 331 to close in on the arm 328 and form a pocket as shown. At about this time brakes are applied to the spring drum 338 and to the hub 340 to prevent the tape from being wound up prematurely to keep it taut and to prevent the arm 335 from being jerked over suddenly when the pocket is being formed. The brake mechanism is illustrated in Fig. 51.

The brake shoe 376 for the spring drum is carried by a lever 377 secured to a shaft 378 which carries an arm 379 provided with a roller 380 engaging a cam surface 381 on the cam 258 carried by the shaft 116. This cam is so formed and so operated that at the proper time the shoe is made to bear on the drum and prevent it from winding the tape prematurely. The brake shoe 382 for the hub or segment 340 is carried by a lever 383 hinged at 384 to the lever 377 and having an arm 385, the lower end of which is pressed outward by a spring 386. A spring 387 yieldingly holds the roller 380 against the cam 381. In this way, at the proper time the shoes are simultaneously applied to the drum and hub with a yielding pressure and at other times the shoes are withdrawn.

Another device which operates while the band is being applied is shown in Figs. 9 and 63. This comprises an arm 388 carried by a shaft 389 provided with an arm 390 (Fig. 63) having a segment of teeth 391 meshing with a toothed segment 392 on a shaft 393 having an arm 394 connected by a link 395 with an arm 396 on the shaft 214. After the pocket is formed in the tape and a band wrapped around the cigar, and as the carrier proceeds, the head 397 of this arm 388 is rocked, engages the roller 342 on the arm 341 and moves the arm 335 from the position shown by full lines in Fig. 9 to that shown by dotted lines in the same figure, thus pulling the tape and rolling the cigar and band to insure the proper application of the band and the adhesive carrying end thereof to the band. This operation is assisted by the spring 398 which supports the roller 342 during the operation and as the arm 388 moves back, the roller 342 moves with it being guided by the spring 398 into the groove 325, and after this no further movement is given to the parts until after they arrive at the ejecting part of the machine.

When a banded cigar has traversed around the machine and arrives at the point M it is ejected by the opening of the pocket in the manner before described. This ejecting operation is assisted by the devices shown in Fig. 39, also in Figs. 6 and 7.

The shelf 450 beneath the platform 1 is provided with an inclined guide 399 over which the banded cigars pass as they go to the shelf and the cigars are received by a light spring 400 which operates on the tapered end of the cigar being ejected and holds the cigar straight or in line parallel with the axis of the carrier. Beneath the shelf is a shaft 401 carrying two arms 402, the upper ends of which are provided with heads 403 which prevent the ejected cigar from dropping prematurely. The arms 402 engage the cigars and push them on to the shelf 450. The shaft 401 is operated by a plate cam 404 operating in a groove 405 in the carrier ring and actuated by the rollers 334 as they approach the ejecting point. The cam 404 is carried by an arm 405ª secured to the shaft 401; a spring 406 holds the cam in the groove. As the pocket is opened to eject a banded cigar the roller 334 on the devices just below those ejecting engages the cam plate and operates the arm 405ª. On the top of the shelf near its rear end is arranged a rod 407 held rigidly by a post 408. To this rod are rigidly secured rearwardly projecting curved fingers 409 and by the side of these curved fingers are other curved fingers 410 which are loosely mounted on the rod 407. The fingers 410 have at their outer end lugs 411 which extend laterally over the outer ends of the fingers 409 and the fingers 409 have laterally projecting lugs 412 which extend over the lower portions of the fingers 410. When a cigar is being ejected and the parts are in the position shown in Fig. 7, the loose fingers 410 serve to guide the cigar to the shelf coöperating with the arms 402 for this purpose. Should a cigar stick to the tape it will raise the fingers 410, the only force against which the cigar will at this time act being the weight of the fingers, but if the cigar firmly adheres to the tape, the fingers 410 will be further raised and finally the cigar will come into contact with the rigidly supported fingers 409 and be forcibly stripped from the tape. This cigar may be by this operation injured and must be thrown aside. After a cigar has been deposited on the springs 400 of the platform, the shaft 401 is operated in the manner before described to actuate the arms 402 and these rising through the openings 413 in the platform will strike the banded cigar and move it out of the way, making place for the next ejected cigar.

The operations of the various mechanisms constituting the machine have been described when describing the construction of such mechanisms and in general the relation of one set of mechanism to a coöperating set has been explained, but I will now describe in a general way the manner in which the cigars are taken from a box, carried through the machine, banded and ejected ready to be returned to the box from which they were taken or to a similar box and replaced in the proper order so that they may be closely and neatly packed and displayed properly, the medallions or prominent parts of the bands to view, it being remembered that in the process of compressing the cigars in the box they were given different shapes and these shapes being somewhat irregular and it is important in order to present the best appearance that the medallions shall be on the faced sides of the cigars and not stretched across the corners or irregular portions thereof.

It has before been fully described how the several rows of cigars in a box are placed upon the transfer table at A and these cigars row by row are moved across the machine platform and placed in position in front of the cigar feeders B and how the cigars are then moved onto the rails or under supports 44 and between the properly adjusted guide bars 45 and 56. When a row of cigars has thus been placed in position, one of the feeders H is lowered into position behind the row and it is properly adjusted, then the threaded nut of this feeder is lowered into engagement with the intermittently moving screw shaft 87 which then operates to move the row of cigars step by step forward toward the banding mechanism. After this row of cigars is started, another row is placed in position and another feeder is lowered and adjusted in the same way. As each feeder arrives at the rear end of the platform it is automatically raised, thrown over onto its top guide 67, automatically has its threaded nut drawn in and is automatically fed back to the starting end of the feeding mechanism. When the first cigar of the first row arrives at the delivery end of the platform the clamping, carrying and abutment mechanisms are in the position shown in Fig. 59 where the first cigar in the series is supported on the lower carrier member 180, is pressed by the spring finger 177 and also bears against the abutment 205 and the spring 204. At this time the upper and lower members of the clamp are elevated and the upper member of the carrier is also elevated; at this time also a band applying device is arranged immediately below said first cigar, the pocket forming arms being thrown open, the tape carrying a band Y one end of which is held by the moistening devices E, and these band-applying devices are at rest. In the further operation of the machine the shaft 150 turns the lower clamps 161 which are raised into engagement with the bottom of the second cigar in the series and the upper clamp members are lowered into engagement with the top of this cigar; at the same time the upper carrier member descends and presses upon the top of the end cigar of the series. This condition of the mechanism is shown in Fig. 60 and the parts are now ready to convey a cigar to the band-applying mechanism, the second cigar in the series being firmly held so that it will not drop off from the end of the platform. The upper and lower members of the carrier then descend, the cigar being guided by the guides 500 depending from the end of the platform. As soon as the carrier members have descended to their full extent the oscillating pocket-forming arm 331 is swung over toward the arm 328 thereby forming a pocket in the tape and wrapping the band Y about the cigar Z, endwise movement of the tape 337 being prevented by the brake hereinbefore referred to and the sudden jerking of the tape upon the arm 335 being also prevented by the brake shoe which bears on its segment hub 340. The cigar is held by the clamping members of the carrier while the pocket is being thus formed. Immediately after this the upper member of the carrier is raised to the position shown in Fig. 62 and then the brake shoes are removed from the spring drum and from the segment 340 so that an endwise movement is given to the tape which causes the inner end of the band to be turned around the cigar and shaped thereto, then the carrier ring is actuated to move the banding device with its contained cigar and band from the position shown at the bottom of Fig. 62 to that shown at the upper part thereof, while at the same time the two members of the carrier and the upper member of the clamp are raised from the position shown in Fig. 62 to that shown in Fig. 59, while the lower member of the clamp 161 is lowered to the position shown in Fig. 59.

When the band-applying devices move from the position shown at the bottom of Fig. 62 to that shown at the upper part thereof, the tape pulling the arm 388 operates upon the roller 342 to give an endwise movement to the tape, causing the band Y to be drawn fully within the pocket and wrapped around the cigar in the manner shown. During this operation also the cigar comes into engagement with the wheels 199 and 201 which press against the cigar on opposite sides of the tape and hold it while the tape is being drawn. In this way the cigar is yieldingly and frictionlessly held while the tape is operating upon the cigar. The cigar thus banded travels around with the ring until it reaches the ejecting point of the machine. Other banding devices in open condition follow along after that just described and are operated in the same way.

It will be understood, of course, from the description in the earlier part of the specification that when a banding device is open in the condition shown in Fig. 59 and in Fig. 9, the moistening device is also open and the band feeder carries a band to the banding device, lays it on the outstretched tape with its end across the top of the pad of the moistening device, then the moistening device is closed and clamps the paste-carrying end of the band while the temporary band holder comes over and holds the band on the tape until the jaws of the band feeder open and recede, then when a cigar is brought down upon the band carrying tape the temporary band holder withdraws, the moistener opens, the pocket is formed and the band is applied in the manner before described.

As soon as a banded cigar arrives at the ejecting point of the machine, the oscillating pocket-forming arm 331 is thrown open, this is done by the rotary block 359 hereinbefore referred to. When the pocket is thus destroyed, the band is stretched, as indicated in the lower part of Fig. 7, and the cigar is ejected on to the receiving platform, being assisted in passing from the band applying device to the platform by the stripping fingers 409 and 410 and by the oscillating arms 402.

It will be observed that the cigars are not permitted to turn around their own axes from the time they leave the box to the time they are positioned upon the bands. The bands are applied to the cigars in such manner that the medallions thereon shall be properly faced. After this is done it is immaterial whether the cigars rotate about their own axes or not, they do this while the bands are being wrapped around them and they also roll onto the platform, but when the operator replaces the cigars in the box with the medallions facing outward, the cigars will be disposed in precisely the same order and in precisely the same relative position that they formerly occupied.

I claim as my invention:

1. A cigar banding machine in which bands are applied to the cigars after they have been removed from a box in which they were pressed and which applies bands thereto without turning the cigars about their axes before receiving the bands, comprising mechanism for feeding the bands, mechanism for applying bands to the cigars, mechanism engaging the rear cigar only in a row for feeding rows of cigars sidewise, means for holding the cigars in close contact with each other and for preventing them from turning while being fed, and mechanism which receives the cigars from said feed mechanism and which clamps each cigar firmly, holds it from movement relatively to the walls of said clamping means and carries it individually away from the feed mechanism to the band-applying mechanism.

2. A cigar banding machine, comprising means for receiving and holding the several superimposed rows of cigars from a box, devices for raising and lowering such cigar receiving and holding means, mechanism for feeding bands, mechanism for applying bands to the cigars, mechanism which receives rows of cigars from said holding means and which feeds them row by row, comprising a pushing device which engages the side of the rearmost cigar in a row, pushes the cigars into close contact with each other and feeds the row forward, means for holding the cigars in close contact with each other and for preventing them from turning and from moving vertically and endwise while being fed; and mechanism for carrying each cigar individually away from the feed mechanism, to the band-applying mechanism.

3. In a cigar banding machine the combination with the platform of the machine, of means for feeding rows of cigars on said platform and means for receiving cigars from a box and holding them, comprising a table provided with horizontally adjustable vertically arranged hinged ends, and means for raising and lowering said table.

4. In a cigar banding machine the combination with the platform of the machine, of means for feeding rows of cigars on said platform, and means for receiving cigars from a box and holding them, comprising a table, a carriage on which the table is supported, and means for supporting and moving the carriage crosswise of the machine and also longitudinally with reference thereto.

5. The combination with the machine platform, of the transfer table comprising a base plate having flanges at its longitudinal edges and provided with intermediate guide lugs, a vertically adjustable bar to which the base plate is pivotally connected, toothed extensions guided by said longitudinal flanges and having slots through which the guide lugs extend, gearing connecting said extensions whereby they may be moved simultaneously and a locking device arranged in one of the flanges and engaging one of the toothed extensions.

6. The combination of a vertically movable supporting bar, a horizontally arranged transfer table centrally pivoted to the upper end of said bar and adapted to swing in a horizontal plane thereon, a locking rod carried by and movable vertically with said supporting bar and also movable vertically relatively thereto and engaging the table to hold it firmly in place on the support.

7. The combination with the machine platform, of the transfer table having the adjustable extensions and hinged end pieces, of a thin metal plate carried by said table and overlapping thin metal supporting plates carried by the extensions and movable therewith in close proximity to each other and to the plate on the table.

8. In a machine for applying bands to cigars, the combination with the machine platform, of a transfer table, toothed laterally adjustable extensions, gearing connecting the toothed extensions, guides in the table for such extensions and thin metal plates carried by the extensions and by the table for affording a smooth surface to the table and the extensions to receive the cigars from a box.

9. In a machine for applying bands to cigars, the combination with the machine platform, having a depressed portion, of the vertically adjustable transfer table having a vertically arranged hinged end adapted to enter said depression in the platform.

10. The combination with the machine platform, of a transfer table, a carriage mounted to move longitudinally of the machine and also transversely relatively thereto, a downwardly extending arm on the carriage, a bearing secured to said arm, a rack bar secured to the transfer table and extending through said bearing, a shaft mounted in said bearing, a pinion on said shaft engaging the rack bar, a spring drum mounted on said bearing and connected with said shaft, ratchet mechanism for holding the drum against the tension of the spring and means for releasing the ratchet to permit the drum to operate to raise the transfer table.

11. In a cigar banding machine the combination with a machine platform, of means for feeding rows of cigars comprising a bracket provided with a depending plate adapted to engage the end cigar of a row, a block with which said bracket has a sliding connection, means for adjusting the position of the bracket in the block, a nut vertically adjustable in said block, and a screw engaging the nut for moving the block with the bracket and plate longitudinally over the machine.

12. In a cigar banding machine the combination with the machine platform, of horizontally arranged guides or tracks for the cigars, feeders engaging the cigars, means for actuating the feeders for intermittently moving the cigars forward over the track, and means for automatically withdrawing the feeders from the cigars when they reach the end of the track.

13. In a cigar banding machine the combination with the machine platform, of the tracks over which the cigars move, guide bars above the tracks for preventing endwise movement of the cigars, guide bars above the tracks and above the cigars for preventing vertical movement thereof and also for preventing the cigars from turning about their own axes, the feeders for moving the cigars forward, and means for actuating the feeders to intermittently advance the cigars.

14. In a cigar banding machine the combination with the machine platform, of guides for the cigars, feeders operating between the guides, means for actuating the feeders to intermittently move the cigars forward, devices for automatically withdrawing the feeders from the cigars, and means for automatically returning the feeders to starting position.

15. The combination with the machine platform of a screw shaft mounted in bearings therein, means for actuating it, and a feeder comprising a block adapted to rest on a guide in the platform, a feeding plate depending therefrom, a nut adapted to engage said screw shaft and arranged within said block, and devices for adjusting the feeder longitudinally of the machine relatively to said block.

16. In a cigar banding machine the combination with the machine platform of a cigar feeder, comprising a feed plate, a feed block to which it is connected, a bracket carried by said block and provided with recesses, guide bars extending through said recesses, a screw shaft operatively connected with the feed block, means for conveying the feed block back to starting position, and means for disengaging the feed block from the screw shaft and for causing it to engage the means for returning it to starting position when said block has arrived at the end of its feed movement.

17. In a cigar banding machine the combination with the machine platform of the rails forming under-supports for the cigars, longitudinally arranged guide bars on opposite sides of said rails for engaging the ends of the cigars, means for adjusting these guide bars toward and from each other, upper guide bars arranged above the path of the cigars, means for adjusting the upper guide bars vertically, and feeders operating between the guides and moving the cigars.

18. In a cigar banding machine the combination with the machine platform of a feeder for moving the cigars over the platform, means for moving the feeder step-by-step in one direction, mechanism for returning the feeder to starting position and means for throwing the feeder out of engagement with the first mentioned operating mechanism into engagement with said returning mechanism.

19. The combination with the machine platform of a feeder, a screw shaft, a nut connected with the feeder and adapted to engage the screw shaft, a device for moving the nut relatively to the feeder out of position to engage the screw shaft, means for returning the feeder to starting position, and devices for disengaging said nut from the screw shaft and for causing it to engage the means which return the feeder to starting position when said feeder has arrived at the end of its feed movement.

20. In a cigar banding machine, the cigar feed mechanism comprising horizontal guide rails over which the cigars slide, means for preventing the cigars from moving endwise and vertically while being fed, a plurality of pushers one in advance of the row of cigars and one in rear thereof which rearmost pusher operates on the side of the rearmost cigar in the row, presses the cigars together and holds the foremost cigar in the row against the foremost pusher while the cigars are being fed and means for operating the pushers.

21. The combination with band-applying and band-feeding mechanisms of a moistener for the bands, comprising a frame, an endless tape, rollers over which the tape passes, mechanism for giving a step-by-step movement to the tape, upper and lower arms between which the tape passes, and means for moving one of these arms toward and from the other to grasp the end of a band between them and to release it therefrom.

22. The combination with band-applying and band-feeding mechanisms of a moistener for the paste-carrying ends of the bands, comprising a frame, a roller carried thereby, means for giving a step-by-step movement to this roller, another roller coöperating with said first mentioned roller, means for yieldingly pressing said rollers toward each other, an endless tape passing between said rollers, another roller traversed by the tape, a spring-controlled arm carrying said roller to impart tension to the tape, a pad-carrying arm over which the tape passes, and an oscillating arm coöperating with said pad-carrying arm and which is traversed by the tape.

23. The combination with band-applying devices, of band-feed mechanism for delivering bands singly to the band-applying devices, a temporary band-holder engaging a band when delivered to the band-applying devices and for holding it thereon during the retreat of the band-feeding mechanism, means for positively moving said temporary band holder into and out of engagement with a band, and a moistening device engaging the paste-carrying end of the band while thus held by the temporary band-holder.

24. The combination with band-applying devices, of mechanism for feeding bands thereto, and a temporary band-holder for holding a band on the band-applying device during the retreat of the band-feeding mechanism, comprising a spring finger, a shaft to which it is attached, and mechanism actuated independently of the band applying devices which is automatically operated to turn said shaft.

25. The combination with band-applying mechanism, of means for feeding rows of cigars toward such mechanism, means for guiding the cigars while thus being fed and for holding them in close contact with each other and mechanism for holding one cigar at a time and carrying it while thus held to the band applying mechanism comprising an oscillating lower clamping member to which a cigar is delivered by said feed mechanism and which remains beneath and supports the cigar until it is grasped by the band-applying mechanism, and an oscillating upper clamping member which is first moved relatively to the lower member and then moved simultaneously therewith to carry the cigar to the band applying mechanism.

26. The combination with band applying mechanism, of mechanism for feeding cigars toward the band-applying mechanism and a carrier for conveying the cigars singly to the band-applying mechanism comprising upper and lower clamping members which firmly engage the cigar and prevent it from moving therein, mechanism for moving said clamping members while holding a cigar against relative movement therein to the band-applying mechanism, means for holding the lower clamping member beneath the cigar thus carried and for supporting it until grasped by the band applying mechanism, and devices for then returning the clamping members to their receiving position.

27. The combination with band applying mechanism, of means for feeding cigars toward such mechanism, and mechanism for carrying cigars to the band-applying mechanism, comprising upper and lower clamp members adapted to engage the cigars singly and successively and to carry them while thus clamped to the band-applying mechanism, devices for holding the lower clamp member in the line of feed while the upper clamp member is elevated, means for then bringing the upper clamp member down upon the cigar resting upon the lower clamp member, mechanism for then causing the two clamp members to move toward the band applying device and for holding the cigar while a band is being wrapped around it, means for then raising the upper clamp member while the cigar is still supported on the lower clamp member, and means for thereafter raising both the upper and lower members simultaneously.

28. The combination with band-applying mechanism, of mechanism for feeding cigars toward said band-applying mechanism, means for carrying cigars individually to the band-applying mechanism and for holding them against movement in said carrying mechanism while being conveyed, and clamping mechanism engaging and firmly holding the cigar next to the cigar held by said carrying mechanism for preventing it from being moved while the carrying mechanism is operating and until after the said mechanism has returned.

29. The combination with band-applying mechanism, of mechanism for feeding cigars toward such mechanism, a carrier for clamping the cigars individually and for carrying them singly to the band applying mechanism, the lower clamp member adapted to engage the cigar next to the one within the carrier, means for raising and lowering this clamp member, an upper clamp member adapted to engage the cigar held by the lower clamp member, and means for raising and lowering said upper clamp member.

30. The combination with band applying mechanism, of means for feeding cigars toward such mechanism, a carrier for conveying cigars one at a time to the band-applying mechanism, a lower clamp member adapted to engage the cigar next in the series to that held by the carrier, and an upper clamp member comprising spring-pressed shoes bearing on the cigars.

31. In a machine for applying bands to cigars, the combination of band-applying mechanism, means for feeding cigars toward such mechanism, lower clamp members for the cigars, a horizontally arranged pivoted rod, clamping shoes supported thereby, means for raising and lowering the rod and devices for turning this rod as it descends to cause the clamping shoes carried thereby to press against the cigars in a direction contrary to the line of feed.

32. The combination with band-applying mechanism and means for feeding cigars, of the upper and lower carrier members, a horizontally arranged shaft, arms attached thereto and carrying the upper member of the cigar carrier, arms loosely mounted on said shaft and carrying the lower member of the cigar carrier, friction devices connected with said lower arms, means carried by the shaft for raising and lowering said lower arms against the force of said friction devices, and means for oscillating the shaft.

33. The combination with band-applying mechanism, of intermittently operated means for pushing rows of cigars toward such mechanism, a carrier for conveying cigars individually from the feeding mechanism to the band-applying mechanism, comprising upper and lower clamps, and an oscillating abutment receiving the end thrust imparted to a row of cigars while the foremost cigar in the row is supported by one of the clamping members and which is moved out of contact with the cigar while the latter is being carried to the band-applying mechanism.

34. The combination with band-applying mechanism, of mechanism for pushing rows of cigars toward such band-applying mechanism, a carrier for conveying cigars from the feeding mechanism to the band-applying mechanism comprising upper and lower clamping members which engage the cigar, a spring finger bearing on the outer end of the row of cigars and receiving the end thrust imparted thereto while the foremost cigar in the row is supported on the lower clamping member, and means for moving said finger away from the cigar while the latter is being carried to the band-applying mechanism.

35. The combination with band-applying mechanism, of mechanism for feeding rows of cigars toward such band-applying mechanism, a carrier for conveying cigars from the feed mechanism to the band-applying mechanism comprising upper and lower clamping members, and a spring finger adapted to bear against the end cigar of a row before it enters the clamping members and to move therewith as said cigar passes into the carrier and to thereafter receive the end thrust while said cigar is contained in said carrier.

36. The combination with band-applying mechanism, of means for conveying rows of cigars toward such mechanism, a carrier for conveying cigars from the feed mechanism to the band-applying mechanism, an oscillating abutment receiving the end thrust imparted to the rows of cigars, a spring finger coöperating with said abutment and which presses against the end cigar of a row before said cigar engages the abutment, and means for withdrawing the abutment from the cigar while it is being carried to the band-applying machine.

37. The combination with band-applying mechanism, of mechanism for feeding cigars toward such mechanism, and a carrier for conveying cigars from the feed-mechanism to the band-applying mechanism which comprises a lower member having a toothed plate, and a toothed abutment engaging said toothed plate against which the cigars bear when in the carrier.

38. Band-applying mechanism, comprising a rotary carrier and a series of sets of band-applying devices carried thereby each comprising a stationary pocket-forming arm, an oscillating pocket-forming arm coöperating therewith, a spring actuated tape connected with said arm, a tape operating arm, means for operating the oscillating pocket-forming arm to bring its end close to the end of the stationary arm to form a pocket in the tape, means for at this time withdrawing spring tension from the tape to permit the formation of a pocket without endwise movement of the tape, and means for thereafter giving an endwise movement to the tape.

39. Band-applying mechanism, comprising a series of sets of band-applying devices, each comprising a stationary pocket-forming arm, an oscillating pocket forming arm, a tape pulling arm, a tape attached thereto, means for applying spring tension to the tape, means for supplying a band and a cigar to the band applying devices while the pocket forming arms are separated, means for then bringing the arms together to form a pocket in the tape which incloses the band and cigar and wraps the former around the latter, and means for operating the tape to draw the band completely into the pocket and to wrap it completely around the cigar.

40. A band applying device, comprising pocket forming arms, a tape, means for applying spring tension to the tape and for moving the tape endwise against such spring tension, means for supplying a band and a cigar to the band applying device while the pocket forming arms are separated, means for bringing the arms together to form a pocket in the tape and to inclose a band and a cigar, means for then giving an endwise movement to the tape in one direction to position the inner end of the band on the cigar, and means for then moving the tape in the opposite direction to completely wrap the band around the cigar.

41. Band-applying mechanism, comprising a series of sets of band-applying devices, each set comprising a stationary pocket-forming arm and an oscillating pocket forming arm, a tape connected with said arms, means for applying spring tension to the tape, a tape pulling arm, an annular carrier on which the band applying devices are mounted, guide grooves in the frame adjacent said carrier one of which controls the movement of the oscillating pocket-forming arm and the other the movement of the tape-pulling arm, and a rotary block interposed in one of said grooves which moves the oscillating pocket forming arm to form a pocket in the tape.

42. Band-applying mechanism, comprising an annular carrier, a series of sets of band applying devices mounted thereon, each set comprising a stationary pocket forming arm, a movable pocket forming arm, a tape connected therewith, means for applying spring tension to the tape, a tape puller to which the tape is connected, guide grooves controlling the movement of the tape puller and the movable pocket-forming arm, and a rotary block in one of said grooves which when the pocket is closed operates upon the movable pocket forming arm to open it and eject a cigar therefrom.

43. In a machine for applying bands to cigars, the combination of pocket forming arms, a spring pulled tape coöperating therewith, a tape puller attached to one end of said tape and movable independently of said arms, and an oscillating arm operating upon the tape puller when the pocket is closed to pull the tape endwise past the ends of the arms and to rotate the cigar and band therein.

44. In a machine for applying bands to cigars, the combination of a rotary carrier, pocket forming arms carried thereby, a wrapping tape supported by the pocket forming arms, a tape puller, a roller carried by said tape-puller, an interrupted guide groove for said roller, a spring in line with said guide groove and an oscillating arm acting on said roller and pressing it against said spring when the tape puller is operated to rotate a band and a cigar in the pocket.

45. The combination with a set of band applying devices of a carrier for conveying cigars thereto while said devices are open, means for closing said devices around a cigar and band and an oscillating abutment having wheels adapted to bear against a cigar when in the closed pocket, and means for rotating the cigar in the pocket while thus supported by the wheels.

46. The combination with band applying devices, of means for operating them to eject a cigar, and a stripper comprising curved loosely mounted fingers and stationary fingers coöperating therewith.

47. The combination with band applying devices of means for operating them to eject cigars, of a stripping device comprising the oscillating arms having heads at their upper ends and loosely mounted curved fingers coöperating with said arms.

48. The combination with band applying devices of means for operating them to eject cigars, the arms having heads at their upper ends adapted to receive the cigars as they are ejected, mechanism for oscillating said arms, and the strippers operating above the heads of said oscillating arms.

In testimony whereof, I have hereunto subscribed my name.

WILLIAM CYRUS BRIGGS.

Witnesses:
  LLOYD B. WIGHT,
  CHARLES F. EARLY.